United States Patent
Fleming, Jr. et al.

(10) Patent No.: US 10,572,376 B2
(45) Date of Patent: Feb. 25, 2020

(54) MEMORY ORDERING IN ACCELERATION HARDWARE

(71) Applicant: INTEL CORPORATION, Santa Clara, CA (US)

(72) Inventors: Kermin Elliott Fleming, Jr., Hudson, MA (US); Simon C. Steely, Jr., Hudson, NH (US); Kent D. Glossop, Nashua, NH (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 15/396,038

(22) Filed: Dec. 30, 2016

(65) Prior Publication Data

US 2018/0188997 A1    Jul. 5, 2018

(51) Int. Cl.
*G06F 12/00* (2006.01)
*G06F 9/30* (2018.01)
(Continued)

(52) U.S. Cl.
CPC ............ *G06F 12/00* (2013.01); *G06F 3/0659* (2013.01); *G06F 3/0685* (2013.01);
(Continued)

(58) Field of Classification Search
CPC ... G06F 9/30043; G06F 9/3838; G06F 9/3857
See application file for complete search history.

(56) References Cited

U.S. PATENT DOCUMENTS

| 672,177 A | 4/1901 | William |
| 5,241,635 A | 8/1993 | Papadopoulos et al. |

(Continued)

FOREIGN PATENT DOCUMENTS

| EP | 2854026 A1 | 4/2015 |
| EP | 2660716 A1 | 11/2016 |

(Continued)

OTHER PUBLICATIONS

Parashar et al., "LEAP: A Virtual Platform Architecture for FPGAs," Intel Corporation, 6 pages, 2010.
(Continued)

*Primary Examiner* — Edward J Dudek, Jr.
*Assistant Examiner* — Ralph A Verderamo, III
(74) *Attorney, Agent, or Firm* — Nicholson De Vos Webster & Elliott LLP

(57) ABSTRACT

An integrated circuit includes a memory interface, coupled to a memory to store data corresponding to instructions, and an operations queue to buffer memory operations corresponding to the instructions. The integrated circuit may include acceleration hardware to execute a sub-program corresponding to the instructions. A set of input queues may include an address queue to receive, from the acceleration hardware, an address of the memory associated with a second memory operation of the memory operations, and a dependency queue to receive, from the acceleration hardware, a dependency token associated with the address. The dependency token indicates a dependency on data generated by a first memory operation of the memory operations. A scheduler circuit may schedule issuance of the second memory operation to the memory in response to the dependency queue receiving the dependency token and the address queue receiving the address.

24 Claims, 19 Drawing Sheets

(51) Int. Cl.
  *G06F 3/06*     (2006.01)
  *G06F 9/38*     (2018.01)
(52) U.S. Cl.
  CPC ........ *G06F 9/30043* (2013.01); *G06F 9/3838*
       (2013.01); *G06F 3/0604* (2013.01); *G06F*
                                *3/0619* (2013.01)

(56) References Cited

U.S. PATENT DOCUMENTS

| | | |
|---|---|---|
| 5,465,368 A | 11/1995 | Davidson et al. |
| 5,560,032 A | 9/1996 | Nguyen et al. |
| 5,574,944 A | 11/1996 | Stager |
| 5,581,767 A | 12/1996 | Katsuki et al. |
| 5,655,096 A * | 8/1997 | Branigin ............... G06F 9/3836 |
| | | 712/200 |
| 5,787,029 A | 7/1998 | De Angel |
| 5,790,821 A | 8/1998 | Pflum |
| 5,805,827 A | 9/1998 | Chau et al. |
| 5,930,484 A | 7/1999 | Tran et al. |
| 6,020,139 A | 2/2000 | Schwartz et al. |
| 6,088,780 A | 7/2000 | Yamada et al. |
| 6,141,747 A | 10/2000 | Witt |
| 6,205,533 B1 | 3/2001 | Margolus et al. |
| 6,314,503 B1 | 11/2001 | D'Errico et al. |
| 6,393,454 B1 | 5/2002 | Chu |
| 6,393,536 B1 | 5/2002 | Hughes et al. |
| 6,460,131 B1 | 10/2002 | Trimberger |
| 6,507,947 B1 | 1/2003 | Schreiber et al. |
| 6,553,448 B1 | 4/2003 | Mannion |
| 6,553,482 B1 * | 4/2003 | Witt ....................... G06F 9/3814 |
| | | 712/214 |
| 6,604,120 B1 | 8/2003 | De |
| 6,615,333 B1 | 9/2003 | Hoogerbrugge et al. |
| 6,725,364 B1 | 4/2004 | Crabill |
| 6,728,945 B1 | 4/2004 | Wang |
| 7,000,072 B1 | 2/2006 | Aisaka et al. |
| 7,181,578 B1 | 2/2007 | Guha et al. |
| 7,203,936 B2 | 4/2007 | Gillies et al. |
| 7,257,665 B2 | 8/2007 | Niell et al. |
| 7,290,096 B2 | 10/2007 | Jeter, Jr. et al. |
| 7,379,067 B2 | 5/2008 | Deering et al. |
| 7,380,108 B1 | 5/2008 | Uht et al. |
| 7,486,678 B1 | 2/2009 | Devanagondi et al. |
| 7,509,484 B1 | 3/2009 | Golla et al. |
| 7,546,331 B2 | 6/2009 | Islam et al. |
| 7,630,324 B2 | 12/2009 | Li et al. |
| 7,660,911 B2 | 2/2010 | McDaniel |
| 7,817,652 B1 | 10/2010 | MacAdam et al. |
| 7,911,960 B1 | 3/2011 | Aydemir et al. |
| 7,987,479 B1 | 7/2011 | Day |
| 8,001,510 B1 | 8/2011 | Miller et al. |
| 8,010,766 B2 | 8/2011 | Bhattacharjee et al. |
| 8,055,880 B2 | 11/2011 | Fujisawa et al. |
| 8,156,284 B2 | 4/2012 | Vorbach et al. |
| 8,160,975 B2 | 4/2012 | Tang et al. |
| 8,225,073 B2 | 7/2012 | Master et al. |
| 8,332,597 B1 | 12/2012 | Bennett |
| 8,356,162 B2 | 1/2013 | Muff et al. |
| 8,495,341 B2 | 7/2013 | Busaba et al. |
| 8,561,194 B2 | 10/2013 | Lee |
| 8,578,117 B2 | 11/2013 | Burda et al. |
| 8,812,820 B2 | 8/2014 | Vorbach et al. |
| 8,935,515 B2 | 1/2015 | Colavin et al. |
| 8,966,457 B2 | 2/2015 | Ebcioglu et al. |
| 8,990,452 B2 | 3/2015 | Branson et al. |
| 9,026,769 B1 | 5/2015 | Jamil et al. |
| 9,104,474 B2 | 8/2015 | Kaul et al. |
| 9,110,846 B2 | 8/2015 | Buchheit et al. |
| 9,135,057 B2 | 9/2015 | Branson et al. |
| 9,170,846 B2 | 10/2015 | Delling et al. |
| 9,213,571 B2 | 12/2015 | Ristovski et al. |
| 9,268,528 B2 | 2/2016 | Tannenbaum et al. |
| 9,285,860 B2 | 3/2016 | Hofmann |
| 9,473,144 B1 | 10/2016 | Thiagarajan et al. |
| 9,594,521 B2 | 3/2017 | Blagodurov et al. |
| 9,658,676 B1 | 5/2017 | Witek et al. |
| 9,696,928 B2 | 7/2017 | Cain, III et al. |
| 9,760,291 B2 | 9/2017 | Beale et al. |
| 9,762,563 B2 | 9/2017 | Davis et al. |
| 9,847,783 B1 | 12/2017 | Teh et al. |
| 9,886,072 B1 | 2/2018 | Venkataraman |
| 9,923,905 B2 | 3/2018 | Amiri et al. |
| 9,946,718 B2 | 4/2018 | Bowman et al. |
| 10,108,417 B2 | 10/2018 | Krishna et al. |
| 10,187,467 B2 | 1/2019 | Nagai |
| 2002/0026493 A1 | 2/2002 | Scardamalia et al. |
| 2002/0090751 A1 | 7/2002 | Grigg et al. |
| 2002/0178285 A1 | 11/2002 | Donaldson et al. |
| 2002/0184291 A1 | 12/2002 | Hogenauer |
| 2003/0023830 A1 | 1/2003 | Hogenauer |
| 2003/0028750 A1 | 2/2003 | Hogenauer |
| 2003/0126233 A1 * | 7/2003 | Bryers .................... H04L 29/06 |
| | | 709/219 |
| 2003/0163649 A1 | 8/2003 | Kapur et al. |
| 2003/0177320 A1 | 9/2003 | Sah et al. |
| 2003/0225814 A1 | 12/2003 | Saito et al. |
| 2003/0233643 A1 | 12/2003 | Thompson et al. |
| 2004/0001458 A1 | 1/2004 | Dorenbosch et al. |
| 2004/0022094 A1 | 2/2004 | Radhakrishnan et al. |
| 2004/0022107 A1 | 2/2004 | Zaidi et al. |
| 2004/0124877 A1 | 7/2004 | Parkes |
| 2004/0263524 A1 | 12/2004 | Lippincott |
| 2005/0025120 A1 | 2/2005 | O'Toole et al. |
| 2005/0076187 A1 | 4/2005 | Claydon |
| 2005/0108776 A1 | 5/2005 | Carver et al. |
| 2005/0134308 A1 | 6/2005 | Okada et al. |
| 2005/0138323 A1 | 6/2005 | Snyder |
| 2005/0166038 A1 | 7/2005 | Wang et al. |
| 2005/0172103 A1 | 8/2005 | Inuo et al. |
| 2005/0223131 A1 | 10/2005 | Goekjian et al. |
| 2006/0041872 A1 | 2/2006 | Poznanovic et al. |
| 2006/0101237 A1 | 5/2006 | Mohl et al. |
| 2006/0130030 A1 | 6/2006 | Kwiat et al. |
| 2006/0179255 A1 | 8/2006 | Yamazaki |
| 2006/0179429 A1 | 8/2006 | Eggers et al. |
| 2007/0011436 A1 | 1/2007 | Bittner, Jr. et al. |
| 2007/0033369 A1 | 2/2007 | Kasama et al. |
| 2007/0079036 A1 | 4/2007 | Mukherjee |
| 2007/0118332 A1 | 5/2007 | Meyers et al. |
| 2007/0143546 A1 | 6/2007 | Narad |
| 2007/0180315 A1 | 8/2007 | Aizawa et al. |
| 2007/0203967 A1 | 8/2007 | Dockser et al. |
| 2007/0204137 A1 * | 8/2007 | Tran .................... G06F 9/30181 |
| | | 712/214 |
| 2007/0226458 A1 | 9/2007 | Stuttard et al. |
| 2007/0276976 A1 | 11/2007 | Gower et al. |
| 2008/0005392 A1 | 1/2008 | Amini et al. |
| 2008/0082794 A1 | 4/2008 | Yu et al. |
| 2008/0133889 A1 | 6/2008 | Glew |
| 2008/0133895 A1 | 6/2008 | Sivtsov et al. |
| 2008/0155135 A1 | 6/2008 | Garg et al. |
| 2008/0184255 A1 | 7/2008 | Watanabe et al. |
| 2008/0218203 A1 | 9/2008 | Arriens et al. |
| 2008/0263330 A1 | 10/2008 | May et al. |
| 2008/0270689 A1 | 10/2008 | Gotoh |
| 2008/0307258 A1 | 12/2008 | Challenger et al. |
| 2009/0013329 A1 | 1/2009 | May et al. |
| 2009/0037697 A1 | 2/2009 | Ramani et al. |
| 2009/0063665 A1 | 3/2009 | Bagepalli et al. |
| 2009/0113169 A1 | 4/2009 | Yang et al. |
| 2009/0119456 A1 | 5/2009 | Park, II et al. |
| 2009/0175444 A1 | 7/2009 | Douglis et al. |
| 2009/0182993 A1 | 7/2009 | Fant |
| 2009/0300324 A1 | 12/2009 | Inuo |
| 2009/0300325 A1 | 12/2009 | Paver et al. |
| 2009/0300388 A1 | 12/2009 | Mantor et al. |
| 2009/0309884 A1 | 12/2009 | Lippincott et al. |
| 2009/0328048 A1 | 12/2009 | Khan et al. |
| 2010/0017761 A1 | 1/2010 | Higuchi et al. |
| 2010/0115168 A1 | 5/2010 | Bekooij |
| 2010/0180105 A1 | 7/2010 | Asnaashari |
| 2010/0191911 A1 | 7/2010 | Heddes et al. |
| 2010/0217915 A1 | 8/2010 | O'Connor et al. |

(56) References Cited

U.S. PATENT DOCUMENTS

| | | |
|---|---|---|
| 2010/0228885 A1 | 9/2010 | McDaniel et al. |
| 2010/0262721 A1 | 10/2010 | Asnaashari et al. |
| 2010/0302946 A1 | 12/2010 | Yang et al. |
| 2011/0004742 A1 | 1/2011 | Hassan |
| 2011/0008300 A1 | 1/2011 | Wouters et al. |
| 2011/0040822 A1 | 2/2011 | Eichenberger et al. |
| 2011/0083000 A1 | 4/2011 | Rhoades et al. |
| 2011/0099295 A1 | 4/2011 | Wegener |
| 2011/0107337 A1 | 5/2011 | Cambonie et al. |
| 2011/0202747 A1 | 8/2011 | Busaba et al. |
| 2011/0292708 A1 | 12/2011 | Kang et al. |
| 2011/0302358 A1 | 12/2011 | Yu et al. |
| 2011/0314238 A1 | 12/2011 | Finkler et al. |
| 2011/0320724 A1 | 12/2011 | Mejdrich et al. |
| 2012/0017066 A1 | 1/2012 | Vorbach et al. |
| 2012/0066483 A1 | 3/2012 | Boury et al. |
| 2012/0079168 A1 | 3/2012 | Chou et al. |
| 2012/0089812 A1 | 4/2012 | Smith |
| 2012/0124117 A1 | 5/2012 | Yu et al. |
| 2012/0126851 A1 | 5/2012 | Kelem et al. |
| 2012/0174118 A1 | 7/2012 | Watanabe et al. |
| 2012/0239853 A1 | 9/2012 | Moshayedi |
| 2012/0260239 A1 | 10/2012 | Martinez et al. |
| 2012/0278543 A1 | 11/2012 | Yu et al. |
| 2012/0278587 A1 | 11/2012 | Caufield et al. |
| 2012/0303932 A1 | 11/2012 | Farabet et al. |
| 2012/0303933 A1 | 11/2012 | Manet et al. |
| 2012/0317388 A1 | 12/2012 | Driever et al. |
| 2012/0324180 A1 | 12/2012 | Asnaashari et al. |
| 2012/0330701 A1 | 12/2012 | Hyder et al. |
| 2013/0021058 A1 | 1/2013 | Huang et al. |
| 2013/0024875 A1 | 1/2013 | Wang et al. |
| 2013/0036287 A1 | 2/2013 | Chu et al. |
| 2013/0067138 A1 | 3/2013 | Schuette et al. |
| 2013/0080652 A1 | 3/2013 | Cradick et al. |
| 2013/0080993 A1 | 3/2013 | Stravers et al. |
| 2013/0081042 A1 | 3/2013 | Branson et al. |
| 2013/0125127 A1 | 5/2013 | Mital et al. |
| 2013/0145203 A1 | 6/2013 | Fawcett et al. |
| 2013/0147515 A1 | 6/2013 | Wasson et al. |
| 2013/0151919 A1 | 6/2013 | Huynh |
| 2013/0315211 A1 | 11/2013 | Balan et al. |
| 2014/0098890 A1 | 4/2014 | Sermadevi et al. |
| 2014/0115300 A1 | 4/2014 | Bodine |
| 2014/0188968 A1 | 7/2014 | Kaul et al. |
| 2014/0281409 A1 | 9/2014 | Abdallah et al. |
| 2014/0380024 A1 | 12/2014 | Spadini et al. |
| 2015/0007182 A1 | 1/2015 | Rossbach et al. |
| 2015/0026434 A1 | 1/2015 | Basant et al. |
| 2015/0033001 A1 | 1/2015 | Ivanov et al. |
| 2015/0067305 A1 | 3/2015 | Olson et al. |
| 2015/0082011 A1 | 3/2015 | Mellinger et al. |
| 2015/0082075 A1 | 3/2015 | Denman et al. |
| 2015/0089162 A1 | 3/2015 | Ahsan |
| 2015/0089186 A1 | 3/2015 | Kim et al. |
| 2015/0100757 A1 | 4/2015 | Burger et al. |
| 2015/0106596 A1 | 4/2015 | Vorbach et al. |
| 2015/0113184 A1 | 4/2015 | Stanford-Jason et al. |
| 2015/0220345 A1 | 8/2015 | Corbal et al. |
| 2015/0261528 A1* | 9/2015 | Ho .................. G06F 9/3004 711/147 |
| 2015/0268963 A1 | 9/2015 | Etsion et al. |
| 2015/0317134 A1 | 11/2015 | Kim et al. |
| 2015/0379670 A1 | 12/2015 | Koker et al. |
| 2016/0098279 A1 | 4/2016 | Glew |
| 2016/0098420 A1 | 4/2016 | Dickie et al. |
| 2016/0239265 A1 | 8/2016 | Duong et al. |
| 2017/0031866 A1 | 2/2017 | Nowatzki et al. |
| 2017/0062075 A1 | 3/2017 | Barber et al. |
| 2017/0083313 A1 | 3/2017 | Sankaralingam et al. |
| 2017/0092371 A1 | 3/2017 | Harari |
| 2017/0163543 A1 | 6/2017 | Wang et al. |
| 2017/0255414 A1 | 9/2017 | Gerhart et al. |
| 2017/0262383 A1 | 9/2017 | Lee et al. |
| 2017/0286169 A1 | 10/2017 | Ravindran et al. |
| 2017/0293766 A1 | 10/2017 | Schnjakin et al. |
| 2017/0315815 A1 | 11/2017 | Smith et al. |
| 2017/0315978 A1 | 11/2017 | Boucher et al. |
| 2017/0371836 A1 | 12/2017 | Langhammer |
| 2018/0081806 A1 | 3/2018 | Kothinti et al. |
| 2018/0081834 A1 | 3/2018 | Wang et al. |
| 2018/0088647 A1 | 3/2018 | Suryanarayanan et al. |
| 2018/0095728 A1 | 4/2018 | Hasenplaugh et al. |
| 2018/0188983 A1 | 7/2018 | Fleming, Jr. et al. |
| 2018/0189063 A1 | 7/2018 | Fleming et al. |
| 2018/0189231 A1 | 7/2018 | Fleming, Jr. et al. |
| 2018/0189239 A1 | 7/2018 | Nurvitadhi et al. |
| 2018/0189675 A1 | 7/2018 | Nurvitadhi et al. |
| 2018/0218767 A1 | 8/2018 | Wolff |
| 2018/0248994 A1 | 8/2018 | Lee et al. |
| 2018/0285385 A1 | 10/2018 | West et al. |
| 2018/0293162 A1 | 10/2018 | Tsai et al. |
| 2018/0300181 A1 | 10/2018 | Hetzel et al. |
| 2018/0373509 A1 | 12/2018 | Zhang et al. |
| 2019/0004878 A1 | 1/2019 | Adler et al. |
| 2019/0004945 A1 | 1/2019 | Fleming et al. |
| 2019/0004955 A1 | 1/2019 | Adler et al. |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |
| 2019/0042217 A1 | 2/2019 | Glossop et al. |
| 2019/0042218 A1 | 2/2019 | Zhang |
| 2019/0042513 A1 | 2/2019 | Fleming, Jr. et al. |
| 2019/0089354 A1 | 3/2019 | Venugopal et al. |
| 2019/0095369 A1 | 3/2019 | Fleming et al. |
| 2019/0095383 A1 | 3/2019 | Fleming et al. |
| 2019/0101952 A1 | 4/2019 | Diamond et al. |
| 2019/0102179 A1 | 4/2019 | Fleming et al. |
| 2019/0102338 A1 | 4/2019 | Tang et al. |
| 2019/0129720 A1 | 5/2019 | Ivanov |
| 2019/0205263 A1 | 7/2019 | Fleming et al. |
| 2019/0205269 A1 | 7/2019 | Fleming, Jr. et al. |
| 2019/0205284 A1 | 7/2019 | Fleming et al. |
| 2019/0303153 A1 | 10/2019 | Halpern et al. |
| 2019/0303168 A1 | 10/2019 | Fleming et al. |
| 2019/0303263 A1 | 10/2019 | Fleming et al. |
| 2019/0303297 A1 | 10/2019 | Fleming et al. |
| 2019/0303312 A1 | 10/2019 | Ahsan et al. |

FOREIGN PATENT DOCUMENTS

| | | |
|---|---|---|
| RU | 2374684 C1 | 11/2009 |
| WO | 89/01203 A1 | 2/1989 |
| WO | 2014035449 A1 | 3/2014 |
| WO | 2007/031696 A1 | 3/2017 |

OTHER PUBLICATIONS

Kim et al., "Energy-Efficient and High Performance CGRA-based Multi-Core Architecture," Journal of Semiconductor Technology and Science, vol. 14, No. 3, 16 pages, Jun. 2014.

Wikipedia, The Free Encyclopedia, "Priority encoder," https://en.wikipedia.org/w/index.php?title=Priority_encoder&oldid=746908667, 2 pages, revised Oct. 30, 2016.

Wikipedia, The Free Encyclopedia, "Truth table," Logical Implication Table, https://en.wikipedia.org/wiki/Truth_table#Logical_implication, 1 page, revised Nov. 18, 2016.

Williston, Roving Reporter, Intel® Embedded Alliance, "Roving Reporter: FPGA + Intel® Atom™= Configurable Processor," 5 pages, Dec. 2010.

Fleming et al., U.S. Appl. No. 15/396,049, titled "Runtime Address Disambiguation in Acceleration Hardware," 97 pages, filed Dec. 30, 2016.

European Search Report for European Application No. EP172071722, 14 pages, dated Oct. 1, 2018.

Corrected Notice of Allowance from U.S. Appl. No. 15/721,802, dated Jun. 12, 2019, 11 pages.

Corrected Notice of Allowance from U.S. Appl. No. 15/855,964, dated Jun. 25, 2019, 7 pages.

Corrected Notice of Allowance from U.S. Appl. No. 15/640,534, dated Jul. 2, 2019, 12 pages.

(56) References Cited

OTHER PUBLICATIONS

International Search Report and Written Opinion for Application No. PCT/US2019/020243, dated Jun. 19, 2019, 11 pages.
International Search Report and Written Opinion for Application No. PCT/US2019/020270, dated Jun. 14, 2019, 11 pages.
International Search Report and Written Opinion for Application No. PCT/US2019/019965, dated Jun. 13, 2019, 9 pages.
International Search Report and Written Opinion for Application No. PCT/US2019/020287, dated Jun. 12, 2019, 9 pages.
Notice of Allowance from U.S. Appl. No. 15/640,535, dated Jun. 21, 2019, 8 pages.
Notice of Allowance from U.S. Appl. No. 15/396,049, dated Jul. 2, 2019, 70 pages.
Notice of Allowance from U.S. Appl. No. 15/640,538, dated Jul. 3, 2019, 76 pages.
Notice of Allowance from U.S. Appl. No. 15/640,540, dated Jul. 1, 2019, 36 pages.
Non-Final Office Action from U.S. Appl. No. 15/640,542, dated Apr. 2, 2019, 59 pages.
Non-Final Office Action from U.S. Appl. No. 15/719,285, dated Feb. 25, 2019, 47 pages.
Non-Final Office Action from U.S. Appl. No. 15/721,802, dated Mar. 8, 2018, 8 pages.
Non-Final Office Action from U.S. Appl. No. 15/721,809, dated Jun. 14, 2018, 12 pages.
Non-Final Office Action from U.S. Appl. No. 15/855,964, dated Dec. 13, 2018, 13 pages.
Notice of Allowance from U.S. Appl. No. 15/283,295, dated Jan. 3, 2019, 7 pages.
Notice of Allowance from U.S. Appl. No. 15/640,534, dated Jan. 4, 2019, 37 pages.
Notice of Allowance from U.S. Appl. No. 15/640,534, dated May 31, 2019, 9 pages.
Notice of Allowance from U.S. Appl. No. 15/721,802, dated Nov. 30, 2018, 30 pages.
Notice of Allowance from U.S. Appl. No. 15/640,533, dated Oct. 10, 2018, 8 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 14/037,468, dated Mar. 7, 2019, 51 pages.
Notice of Allowance from U.S. Appl. No. 15/283,295, dated Apr. 10, 2019, 49 pages.
Notice of Allowance from U.S. Appl. No. 15/396,395, dated Dec. 28, 2018, 36 pages.
Notice of Allowance from U.S. Appl. No. 15/396,395, dated May 15, 2019, 23 pages.
Notice of Allowance from U.S. Appl. No. 15/640,533, dated Feb. 14, 2019, 43 pages.
Notice of Allowance from U.S. Appl. No. 15/640,533, dated May 22, 2019, 19 pages.
Notice of Allowance from U.S. Appl. No. 15/640,534, dated Apr. 2, 2019, 9 pages.
Notice of Allowance from U.S. Appl. No. 15/640,534, dated Sep. 12, 2018, 7 pages.
Notice of Allowance from U.S. Appl. No. 15/640,535, dated Feb. 6, 2019, 38 pages.
Notice of Allowance from U.S. Appl. No. 15/640,535, dated May 24, 2019, 19 pages.
Notice of Allowance from U.S. Appl. No. 15/640,540, dated Mar. 14, 2019, 39 pages.
Notice of Allowance from U.S. Appl. No. 15/719,281, dated Jan. 24, 2019, 36 pages.
Notice of Allowance from U.S. Appl. No. 15/721,802, dated Jul. 31, 2018, 6 pages.
Notice of Allowance from U.S. Appl. No. 15/721,802, dated Mar. 18, 2019, 23 pages.
Notice of Allowance from U.S. Appl. No. 15/721,809, dated Jun. 6, 2019, 32 pages.
Notice of Allowance from U.S. Appl. No. 15/855,964, dated Apr. 24, 2019, 15 pages.
Notice of Allowance from U.S. Appl. No. 15/859,454, dated Jun. 7, 2019, 55 pages.
Notice of Allowance from U.S. Appl. No. 15/859,466, dated May 17, 2019, 56 pages.
Notice of Allowance from U.S. Appl. No. 16/024,801, dated Jun. 5, 2019, 64 pages.
Notice of Allowance from U.S. Appl. No. 15/396,395, dated Jun. 7, 2019, 8 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE Micro, vol. 34 (3), Mar. 10, 2014, pp. 120-137.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Schmit H., et al., "PipeRench: A Virtualized Programmable Datapath in 0.18 Micron Technology," 2002, IEEE 2002 Custom Integrated Circuits Conference, pp. 63-66.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference, Jan. 2011, 6 pages.
Smith A., et al., "Compiling for EDGE Architectures," Appears in the Proceedings of the 4th International Symposium on code Generation and Optimization, 2006, 11 pages.
Smith A., et al., "Dataflow Predication," 2006, In Proceedings of the 39th Annual IEEE/ACM International Symposium on Microarchitecture, 12 pages.
Suleiman A., et al., "Towards Closing the Energy Gap Between HOG and CNN Features for Embedded Vision," IEEE International Symposium of Circuits and Systems (ISCAS), May 2017, 4 pages.
Swanson S., et al., "The WaveScalar Architecture," May 2007, ACM Transactions on Computer Systems, vol. 25 (2), Article No. 4, 35 pages.
Sze V., "Designing Efficient Deep Learning Systems," in Mountain View, CA, Mar. 27-28, 2019, retrieved from https://professional.mit.edu/programs/short-programs/designing-efficient-deep-learning-systems-OC on Feb. 14, 2019, 2 pages.
Sze V., et al., "Efficient Processing of Deep Neural Networks: A Tutorial and Survey," Mar. 2017, 32 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities," IEEE Custom Integrated Circuits Conference (CICC), Oct. 2017, 9 pages.
Taylor M.B., et al., "The Raw Microprocessor: A Computational Fabric for Software Circuits and General-Purpose Programs," 2002, IEEE Micro, vol. 22 (2), pp. 25-35.
"The LLVM Compiler Infrastructure," retrieved from http://www.llvm.org/, on May 1, 2018, maintained by the llvm-admin team, 4 pages.
Truong D.N., et al., "A 167-Processor Computational Platform in 65 nm CMOS," IEEE Journal of Solid-State Circuits, April 2009, vol. 44 (4), pp. 1130-1144.

(56) References Cited

OTHER PUBLICATIONS

"Tutorial at MICRO-50," The 50th Annual IEEE/ACM International Symposium on Microarchitecture, Oct. 14-18, 2017, retrieved from https://www.microarch.org/micro50/ on Feb. 14, 2019, 3 pages.
"Tutorial on Hardware Architectures for Deep Neural Networks at ISCA 2017," The 44th International Symposium on Computer Architecture, Jun. 24-28, 2017, retrieved from http://isca17.ece.utoronto.ca/doku.php on Feb. 14, 2019, 2 pages.
Van De Geijn R.A., et al., "SUMMA: Scalable Universal Matrix Multiplication Algorithm," 1997, 19 pages.
Vijayaraghavan M., et al., "Bounded Dataflow Networks and Latency-Insensitive Circuits," In Proceedings of the 7th IEEE/ACM International Conference on Formal Methods and Models for Codesign (MEMOCODE'09), Jul. 13-15, 2009, pp. 171-180.
Wikipedia, "TRIPS Architecture," retrieved from https://en.wikipedia.org/wiki/TRIPS_architecture on Oct. 14, 2018, 4 pages.
Yang T., et al., "Deep Neural Network Energy Estimation Tool," IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al., "A Method to Estimate the Energy Consumption of Deep Neural Networks," Asilomar Conference on Signals, Systems and Computers, Oct. 2017, 5 pages.
Yang T., et al., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE Conference on Computer Vision and Pattern Recognition CVPR 2017, Jul. 21-26, 2017, retrieved from http://www.rle.mit.edu/eems/wp-content/uploads/2017/07/2017_cvpr_poster.pdf on Feb. 21, 2019, 1 page.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conferencw on Computer Vision (ECCV), Version 2, Sep. 28, 2018, 16 pages.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.
Yu Z., et al., "An Asynchronous Array of Simple Processors for DSP Applications," IEEE International Solid-State Circuits Conference, ISSCC'06, Feb. 8, 2006, 10 pages.
Abandonment from U.S. Appl. No. 15/640,544, dated Mar. 20, 2018, 2 pages.
Advisory Action from U.S. Appl. No. 14/037,468, dated Aug. 11, 2017, 3 pages.
Arvind., et al., "Executing a Program on the MIT Tagged-Token Dataflow Architecture," Mar. 1990, IEEE Transactions on Computers, vol. 39 (3), pp. 300-318.
Asanovic K., et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.
Ball T., "What's in a Region? or Computing Control Dependence Regions in Near-Linear Time for Reducible Control Flow," Dec. 1993, ACM Letters on Programming Languages and Systems, 2(1-4):1-16, 24 pages.
"Benchmarking DNN Processors," Nov. 2016, 2 pages.
BLUESPEC, "Bluespec System Verilog Reference Guide," Jun. 16, 2010, Bluespec, Inc, 453 pages.
Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.

Burger D., et al., "Scaling to the End of Silicon with EDGE Architectures," Jul. 12, 2004, vol. 37 (7), pp. 44-55.
Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Carloni L.P., et al., "The Theory of Latency Insensitive Design," Sep. 2001, IEEE Transactions on Computer-Aided Design of Integrated Circuits and Systems, vol. 20 (9), 18 pages.
Chandy K.M., et al., "Parallel Program Design: A Foundation," Addison-Wesley Publishing Company, Aug. 1988, 552 pages.
Chen Y., et al., "Eyeriss: A Spacial Architecture for Energy-Efficient Dataflow for Convolutional Neural Networks," Jun. 2016, 53 pages.
Chen Y., et al., "Eyeriss: A Spacial Architecture for Energy-Efficient Dataflow for Convolutional Neural Networks," International Symposium on Computer Architecture (ISCA), Jun. 2016, pp. 367-379.
Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.
Chen Y., et al., "Eyeriss: An Energy-Efficient Reconfigurable Accelerator for Deep Convolutional Neural Networks," IEEE International Solid-State Circuits Conference, ISSCC, 2016, 9 pages.
Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss v2: A Flexible and High-Performance Accelerator for Emerging Deep Neural Networks," Jul. 2018, 14 pages.
Chen Y., et al., "Understanding the Limitations of Existing Energy-Efficient Design Approaches for Deep Neural Networks," Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Chen Y.H., et al., "Eyeriss: An Energy-Efficient Reconfigurable Accelerator for Deep Convolutional Neural Networks," 2016 IEEE International Solid-State Circuits Conference (ISSCC), Jan. 2016, 12 pages.
Compton K., et al., "Reconfigurable Computing: A Survey of Systems and Software," ACM Computing Surveys, Jun. 2002, vol. 34 (2), pp. 171-210.
Cong J., et al., "Supporting Address Translation for Accelerator-Centric Architectures," Feb. 2017, IEEE International Symposium on High Performance Computer Architecture (HPCA), 12 pages.
"CORAL Collaboration: Oak Ridge, Argonne, Livermore," Benchmark codes, downloaded from https://asc.llnl.gov/CORAL-benchmarks/ on Nov. 16, 2018, 6 pages.
Corrected Notice of Allowance from U.S. Appl. No. 14/037,468, dated Apr. 1, 2019, 10 pages.
Corrected Notice of Allowance from U.S. Appl. No. 14/037,468, dated May 29, 2019, 12 pages.
Corrected Notice of Allowance from U.S. Appl. No. 15/640,534, dated Apr. 26, 2019, 21 pages.
Corrected Notice of Allowance from U.S. Appl. No. 15/640,535, dated Feb. 13, 2019, 7 pages.
Corrected Notice of Allowance from U.S. Appl. No. 15/721,802, dated Dec. 18, 2018, 8 pages.
Dally W.J., et al., "Principles and Practices of Interconnection Networks," Morgan Kaufmann, 2003, 584 pages.
Dennis J.B., et al., "A Preliminary Architecture for a Basic Data-Flow Processor," 1975, In Proceedings of the 2nd Annual Symposium on Computer Architecture, pp. 125-131.
Dijkstra E.W., "Guarded Commands, Nondeterminacy and Formal Derivation of Programs," Aug. 1975, Communications of the ACM, vol. 18 (8), pp. 453-457.
Eisenhardt S., et al., "Optimizing Partial Reconfiguration of Multi-Context Architectures," Dec. 2008, 2008 International Conference on Reconfigurable Computing and FPGAs, 6 pages.
Emer J., et al., "Asim: A Performance Model Framework," Feb. 2002, Computer, vol. 35 (2), pp. 68-76.

(56) References Cited

OTHER PUBLICATIONS

Emer J., et al., "Hardware Architectures for Deep Neural Networks at CICS/MTL Tutorial," Mar. 27, 2017, 258 pages.
Emer J., et al., "Hardware Architectures for Deep Neural Networks at ISCA Tutorial," Jun. 24, 2017, 290 pages.
Emer J., et al., "Hardware Architectures for Deep Neural Networks at MICRO-49 Tutorial," Oct. 16, 2016, 300 pages.
Emer J., et al., "Tutorial on Hardware Architectures for Deep Neural Networks," Nov. 2016, 8 pages.
Emer J.S., et al., "A Characterization of Processor Performance in the VAX-11/780," In Proceedings of the 11th Annual International Symposium on Computer Architecture, Jun. 1984, vol. 12 (3), pp. 274-283.
Extended European Search Report for Application No. 17210484.6, dated May 29, 2018, 8 pages.
Final Office Action from U.S. Appl. No. 13/994,582, dated Oct. 3, 2017, 11 pages.
Final Office Action from U.S. Appl. No. 14/037,468, dated Jun. 1, 2017, 18 pages.
Final Office Action from U.S. Appl. No. 14/037,468, dated Jun. 15, 2018, 7 pages.
Final Office Action from U.S. Appl. No. 14/037,468, dated May 16, 2016, 24 pages.
Final Office Action from U.S. Appl. No. 14/037,468, dated Oct. 5, 2016, 17 pages.
Final Office Action from U.S. Appl. No. 15/396,049, dated Dec. 27, 2018, 38 pages.
Final Office Action from U.S. Appl. No. 15/396,402, dated May 17, 2019, 85 pages.
Final Office Action from U.S. Appl. No. 15/721,809, dated Dec. 26, 2018, 46 pages.
Final Office Action from U.S. Appl. No. 15/859,473, dated Feb. 26, 2019, 13 pages.
Fleming K., et al., "Leveraging Latency-Insensitivity to Ease Multiple FPGA Design," In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Achieve Scalable Reconfigurable Computation," Feb. 2013, 197 pages.
Fleming et al., U.S. Appl. No. 15/396,038, titled "Memory Ordering in Acceleration Hardware," 81 pages, filed Dec. 30, 2016.
"Full Day Tutorial Held at MICRO-49," Oct. 15-19, 2016, retrieved from https://www.microarch.org/micro49/ on Feb. 14, 2019, 2 pages.
Govindaraju et al.,"DySER: Unifying Functionality and Parallelism Specialization for Energy-Efficient Computing," Published by the IEEE Computer Society, Sep./Oct. 2012, pp. 38-51.
Govindaraju V., et al., "Dynamically Specialized Datapaths for Energy Efficient Computing," 2011, In Proceedings of the 17th International Conference on High Performance Computer Architecture, 12 pages.
Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.
Han S., et al., "EIE: Efficient Inference Engine on Compressed Deep Neural Network," ISCA, May 2016, 12 pages.
Hauser J.R., et al., "Garp: a MIPS processor with a Reconfigurable Coprocessor," Proceedings of the 5th Annual IEEE Symposium on Field-Programmable Custom Computing Machines, 1997, 10 pages.
Hoogerbrugge J., et al., "Transport-Triggering vs. Operation-Triggering," 1994, In Compiler Construction, Lecture Notes in Computer Science, vol. 786, Springer, pp. 435-449.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Ibrahim Eng., Walaa Abd El Aziz, "Binary Floating Point Fused Multiply Add Unit", Faculty of Engineering, Cairo University Giza, Egypt, 2012, 100 Pages.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, Updated—May 18, 2018, 19 pages.
International Preliminary Report on Patentability for Application No. PCT/RU2011/001049, dated Jul. 10, 2014, 6 pages.
International Preliminary Report on Patentability for Application No. PCT/US2017/050663, dated Apr. 11, 2019, 11 pages.
International Search Report and Written Opinion for Application No. PCT/RU2011/001049, dated Sep. 20, 2012, 6 pages.
International Search Report and Written Opinion received for PCT Patent Application No. PCT/US2017/050663, dated Dec. 28, 2017, 14 pages.
Kalte H., et al., "Context Saving and Restoring for Multitasking in Reconfigurable Systems," International Conference on Field Programmable Logic and Applications, Aug. 2005, pp. 223-228.
King M., et al., "Automatic Generation of Hardware/Software Interfaces," Proceedings of the 17th International Conference on Architectural Support for Programming Languages and Operating Systems, ASPLOS'12, Mar. 2012, 12 pages.
Knuth D.E., et al., "Fast Pattern Matching in Strings," Jun. 1977, SIAM Journal of Computing, vol. 6(2), pp. 323-350.
Lee T., et al., "Hardware Context-Switch Methodology for Dynamically Partially Reconfigurable Systems," Journal of Information Science and Engineering, vol. 26, Jul. 2010, pp. 1289-1305.
Lewis D., et al., "The Stratix™ 10 Highly Pipelined FPGA Architecture," FPGA 2016, Altera, Feb. 23, 2016, 26 pages.
Lewis D., et al., "The Stratix™ 10 Highly Pipelined FPGA Architecture," FPGA'16, ACM, Feb. 21-23, 2016, pp. 159-168.
Li S., et al., "Case Study: Computing Black-Scholes with Intel® Advanced Vector Extensions," Sep. 6, 2012, 20 pages.
Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Matsen F.A., et al., "The CMU warp processor," In Supercomputers: Algorithms, Architectures, and Scientific Computation, 1986, pp. 235-247.
McCalpin J.D., "Memory Bandwidth and Machine Balance in Current High Performance Computers," IEEE Computer Society Technical Committee on Computer Architecture (TCCA) Newsletter, Dec. 1995, 7 pages.
McCalpin J.D., "STREAM: Sustainable memory bandwidth in high performance computers," 2016, 4 pages.
Mei B., et al., "ADRES: An Architecture with Tightly Coupled VLIW Processor and Coarse-Grained Reconfigurable Matrix," 2003, In Proceedings of International Conference on Field-Programmable Logic and Applications, 10 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Mirsky E., at al., "MATRIX: A Reconfigurable Computing Architecture with Configurable Instruction Distribution and Deployable Resources," 1996, In Proceedings of the IEEE Symposium on FPGAs for Custom Computing Machines, pp. 157-166.
Natalie E.J., et al., "On-Chip Networks," Synthesis Lectures on Computer Architecture, Morgan and Claypool Publishers, 2009, 148 pages.
Non-Final Office Action from U.S. Appl. No. 14/037,468, dated Oct. 19, 2017, 19 pages.
Non-Final Office Action from U.S. Appl. No. 15/396,402, dated Nov. 1, 2018, 22 pages.

(56) References Cited

OTHER PUBLICATIONS

Non-Final Office Action from U.S. Appl. No. 15/640,540, dated Oct. 26, 2018, 8 pages.
Non-Final Office Action from U.S. Appl. No. 15/640,543, dated Jan. 2, 2019, 46 pages.
Non-Final Office Action from U.S. Appl. No. 15/396,049, dated Jun. 15, 2018, 33 pages.
Non-Final Office Action from U.S. Appl. No. 15/859,473, dated Oct. 15, 2018, 10 pages.
Non-Final Office Action from U.S. Appl. No. 13/994,582, dated Mar. 23, 2017, 9 pages.
Non-Final Office Action from U.S. Appl. No. 13/994,582, dated Feb. 7, 2018, 12 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 15/283,295, dated Apr. 30, 2018, 18 pages.
Non-Final Office Action from U.S. Appl. No. 15/396,395, dated Jul. 20, 2018, 18 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/640,541, dated Apr. 12, 2019, 61 pages.
Final office action from U.S. Appl. No. 15/640,542, dated Aug. 7, 2019, 46 pages.
Non-Final office action from U.S. Appl. No. 16/236,423, dated Aug. 21, 2019, 75 pages.
Notice of Allowance from U.S. Appl. No. 15/396,395, dated Aug. 7, 2019, 12 pages.
Notice of Allowance from U.S. Appl. No. 15/640,535, dated Aug. 21, 2019, 13 pages.
Notice of Allowance from U.S. Appl. No. 15/640,541, dated Aug. 13, 2019, 19 pages.
Notice of Allowance from U.S. Appl. No. 15/396,402, dated Sep. 16, 2019, 15 pages.
Notice of Allowance from U.S. Appl. No. 15/640,533, dated Sep. 12, 2019, 16 pages.
Notice of Allowance from U.S. Appl. No. 15/721,809, dated Sep. 5, 2019, 8 pages.
Notice of Allowance from U.S. Appl. No. 15/859,454, dated Sep. 12, 2019, 8 pages.
Notice of Allowance from U.S. Appl. No. 15/944,761, dated Sep. 12, 2019, 75 pages.
Notice of Allowance from U.S. Appl. No. 16/024,801, dated Sep. 12, 2019, 10 pages.
Notice of Allowance from U.S. Appl. No. 15/640,538, dated Sep. 20, 2019, 8 pages.
Notice of Allowance from U.S. Appl. No. 15/640,543, dated Jul. 29, 2019, 43 pages.
Notice of Allowance from U.S. Appl. No. 15/719,285, dated Jul. 23, 2019, 26 pages.
Non-Final Office Action, U.S. Appl. No. 15/721,816, dated Dec. 5, 2019, 18 pages.
Schauser et al., "Compiler-Controlled Multithreading for Lenient Parallel Languages", Aug. 1991, pp. 1-21.
Non-Final Office Action, U.S. Appl. No. 16/024,849, dated Nov. 29, 2019, 10 pages.
Non-Final Office Action, U.S. Appl. No. 15/944,546, dated Nov. 25, 2019, 22 pages.
Notice of Allowance, U.S. Appl. No. 15/396,049, dated Oct. 16, 2019, 2 pages.
Notice of Allowance, U.S. Appl. No. 15/944,761, dated Nov. 1, 2019, 2 pages.

\* cited by examiner

| | Input Queue ID | Output Queue ID | Depedency Queue ID | MemOp |
|---|---|---|---|---|
| Logical | Channel 0 — 610 | Compl. Chan. 1 — 620 | DepIn: Channel B0<br>DepOut: Counter C0 — 630 | Load — 640 |
| Binary (provisional) | 001 | 010 | 1000/0001 | 00 |

```
for(i) {
   temp = p[i];
   p[i+2] = temp;
}
```
unfolded ⟹
```
temp = p[0];
p[2] = temp;
temp = p[1];
p[3] = temp;
temp = p[2];
p[4] = temp;
temp = p[3];
p[5] = temp;
temp = p[4];
p[6] = temp;
....
```

FIG. 9A

```
for(i) {
   temp = p[i];
   p[i+2] = temp;
}
```
unfolded ⟹
```
temp = p[0];
p[2] = temp;
temp = p[1];
p[3] = temp;
temp = p[2];
p[4] = temp;
temp = p[3];
p[5] = temp;
temp = p[4];
p[6] = temp;
....
```

FIG. 9B

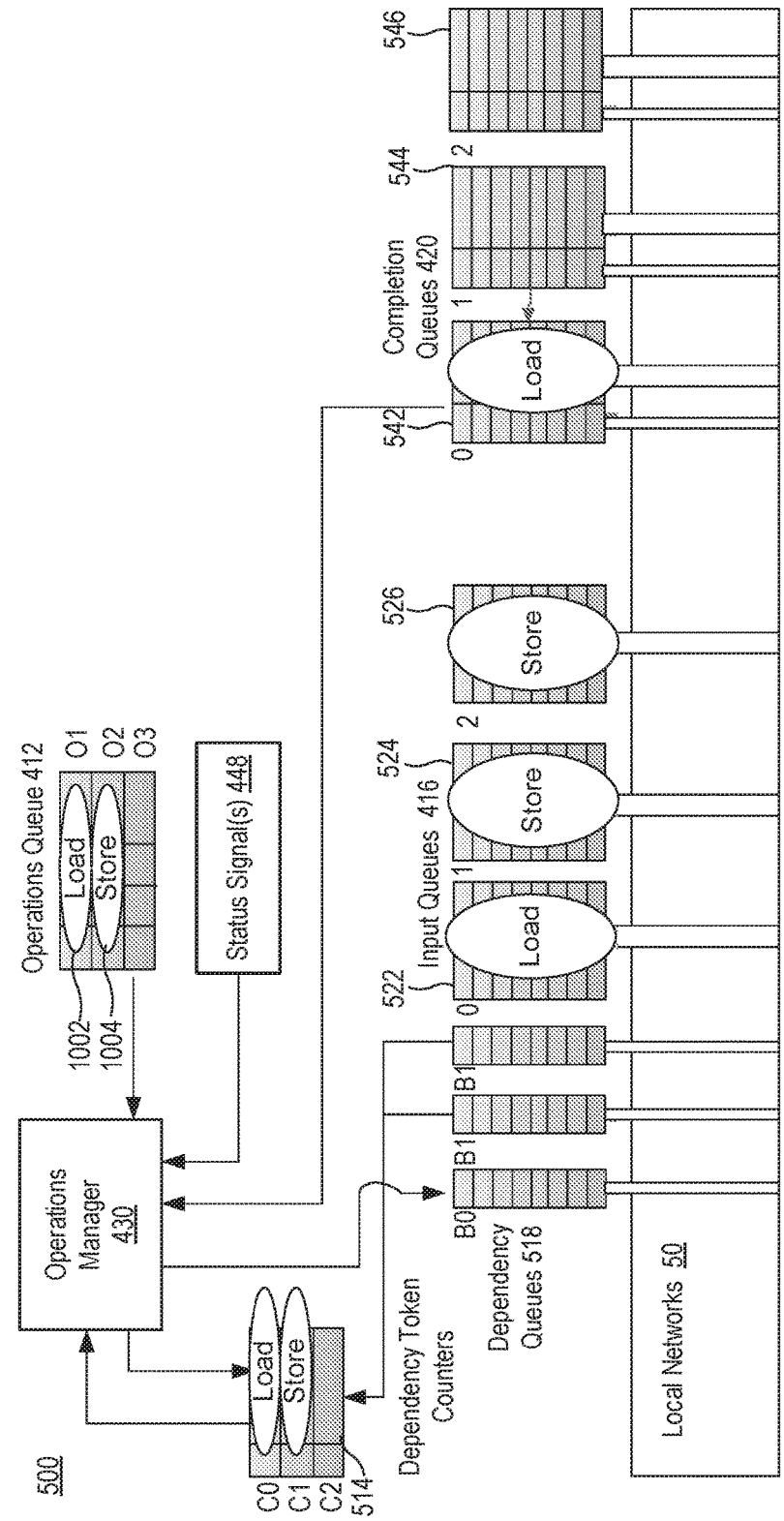

| Counter_0 | 0 |
| Counter_1 | 1 |

*Incoming Value*
Outgoing Value

| Load Addr. | Store Addr. | Store Data | Completion | |
|---|---|---|---|---|
| p[1] | p[2] | | 1 | 0 |
| p[2] | p[3] | | | |
| *p[3]* | p[4] | | | |
| | *p[5]* | | | |
| | | | | |
| | | | | |
| | | | | |
| | | | | |

FIG. 11D

| Counter_0 | 0 |
| Counter_1 | 1 |

*Incoming Value*
Outgoing Value

| Load Addr. | Store Addr. | Store Data | Completion |
|---|---|---|---|
| p[1] | p[2] | 0 | |
| p[2] | p[3] | | |
| p[3] | p[4] | | |
| *p[4]* | p[5] | | |
| | *p[6]* | | |
| | | | |
| | | | |
| | | | |

FIG. 11E

| Counter_0 | 0 |
| Counter_1 | 1 |

*Incoming Value*
Outgoing Value

| Load Addr. | Store Addr. | Store Data | Completion |
|---|---|---|---|
| p[1] | p[2] | 0 | |
| p[2] | p[3] | | |
| p[3] | p[4] | | |
| p[4] | p[5] | | |
| *p[5]* | p[6] | | |
| | *p[7]* | | |
| | | | |
| | | | |

FIG. 11F

| Counter_0 | 1 |
|---|---|
| Counter_1 | 0 |

*Incoming Value*
Outgoing Value

| Load Addr. | Store Addr. | Store Data | Completion | |
|---|---|---|---|---|
| p[1] | p[3] | | 0 | |
| p[2] | p[4] | | | |
| p[3] | p[5] | | | |
| p[4] | p[6] | | | |
| p[5] | p[7] | | | |
| *p[6]* | *p[8]* | | | |
| | | | | |
| | | | | |

FIG. 11G

| Counter_0 | 0 |
|---|---|
| Counter_1 | 1 |

*Incoming Value*
Outgoing Value

| Load Addr. | Store Addr. | Store Data | Completion | |
|---|---|---|---|---|
| p[2] | p[3] | | 1 | 1 |
| p[3] | p[4] | | | |
| p[4] | p[5] | | | |
| p[5] | p[6] | | | |
| p[6] | p[7] | | | |
| *p[7]* | p[8] | | | |
| | *p[9]* | | | |
| | | | | |

FIG. 11H

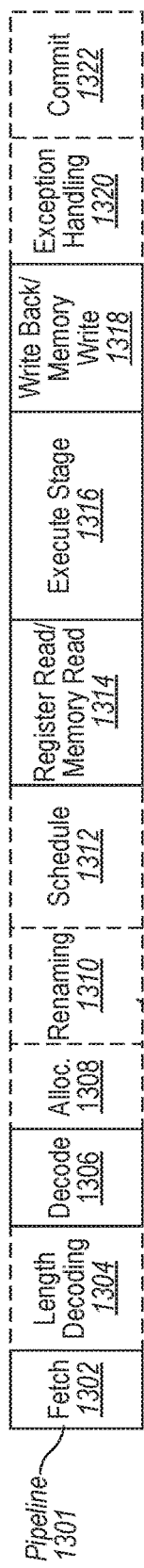
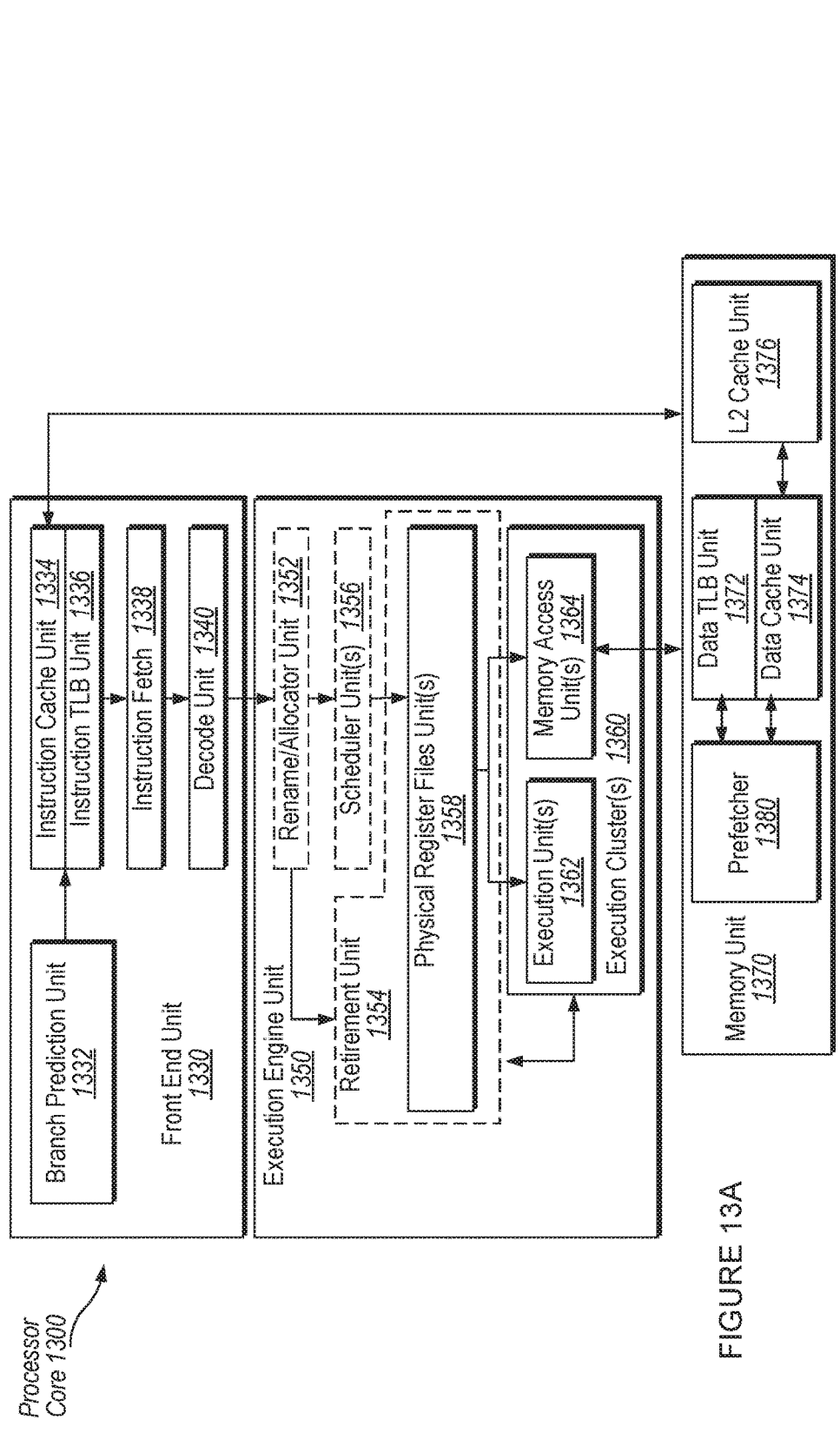
FIGURE 13B
FIGURE 13A

US 10,572,376 B2

MEMORY ORDERING IN ACCELERATION HARDWARE

FEDERALLY SPONSORED RESEARCH OR DEVELOPMENT

This invention was made with Government support under contract number H98230A-13-D-0124 awarded by the Department of Defense. The Government has certain rights in the invention.

TECHNICAL FIELD

The present disclosure relates to acceleration hardware, and in particular, to memory ordering in acceleration hardware such as spatial arrays.

BACKGROUND

Acceleration hardware refers to devices that speed up data communications, storage and retrieval, encryption and decryption, mathematical operations, graphics, Web page viewing, and the like. Acceleration hardware may include individual integrated circuit (also called an IC or chip), a printed circuit card, or a self-contained system. A few examples of acceleration hardware include a network access accelerator (NAS), a graphics accelerator, and a floating point accelerator (FPA). In one embodiment, acceleration hardware is instantiated as spatial architecture, which is energy efficient and a high-performance means of accelerating user applications in computing systems using spatial arrays. A spatial architecture includes an array of processing components, such as gates in a Field Programmable Gate Array (FPGA) or other processing elements (PE).

BRIEF DESCRIPTION OF THE DRAWINGS

FIG. 8 is a block diagram of an exemplary load operation, both logical and in binary, according to an embodiment of the present disclosure.

FIG. 9A is flow diagram illustrating logical execution of an example code, according to an embodiment of the present disclosure.

FIG. 9B is the flow diagram of FIG. 9A, illustrating memory-level parallelism in an unfolded version of the example code, according to an embodiment of the present disclosure.

FIG. 10A is a block diagram of exemplary memory arguments for a load operation and for a store operation, according to an embodiment of the present disclosure.

FIG. 10B is a block diagram illustrating flow of load operations and the store operations, such as those of FIG. 10A, through the microarchitecture of the memory ordering circuit of FIG. 5, according to an embodiment of the present disclosure.

FIGS. 11A, 11B, 11C, 11D, 11E, 11F, 11G, and 11H are block diagrams illustrating functional flow of load operations and store operations for an exemplary program through queues of the microarchitecture of FIG. 11B, according to an embodiment of the present disclosure.

FIG. 13A is a block diagram illustrating an in-order pipeline and a register renaming stage, out-of-order issue/execution pipeline according to one embodiment.

FIG. 13B is a block diagram illustrating a micro-architecture for a processor or an integrated circuit that includes the memory subsystem and the acceleration hardware of FIGS. 1A-1B, according to an embodiment of the present disclosure.

DESCRIPTION OF EMBODIMENTS

Figure 1A:
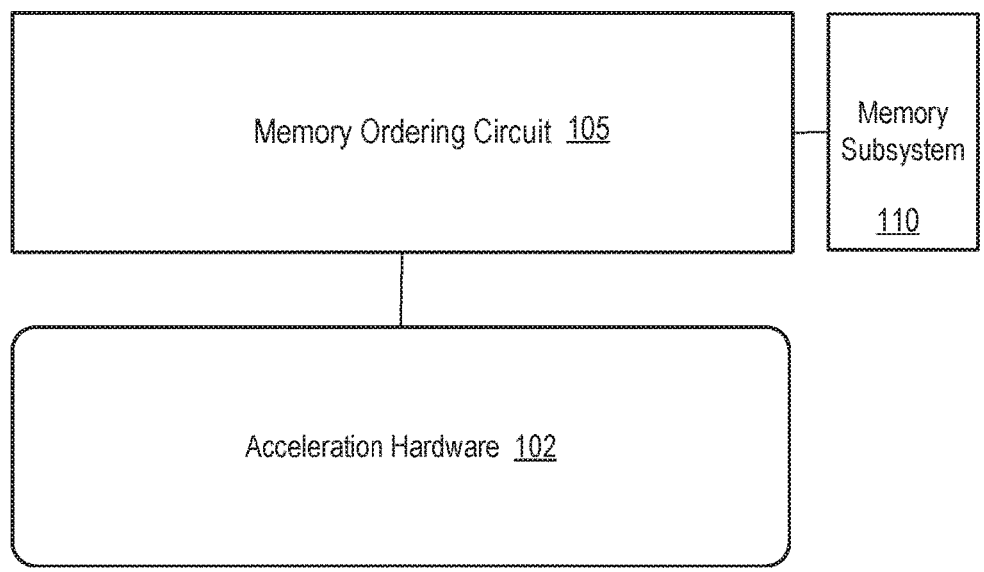
FIG. 1A is a block diagram of a system that employs a memory ordering circuit interposed between a memory subsystem and acceleration hardware, according to an embodiment of the present disclosure.

Disclosed is architecture for describing memory ordering dependencies within acceleration hardware. As discussed, one example of acceleration hardware is spatial computing fabric ("spatial fabric"), such as exists in a Field Programmable Gate Array (FPGA), in a Loop-Processing Unit (LPU), or the like. A challenge faced by such architectures is the mapping of a broad set of existing sequential or partially parallel applications to the spatial array, which is distributed by nature and highly parallel. The main difficulty in performing this mapping is the automatic parallelization of memory accesses in legacy programs due to a centralized, largely sequential memory model present in legacy programming environments.

Consider, for example, the following code:

```
for (i) {
    p[f(i)] = p[g(i)];
}
```

In general, compilers cannot prove that f(i) is not the same as g(i), either for the same value of i or different values of i across loop bodies. This is known as pointer or memory aliasing. To generate statically correct code, compilers are usually forced to serialize the accesses to the array, p. However, it is often the case at runtime that f(i) and g(i) are not equal, giving an opportunity to obtain dynamic parallelism in hardware. In spatial architectures, however, no mechanisms exist to check for and exploit dependencies that facilitate exploiting parallelism that may arise during code execution.

The disclosed architecture provides flexibility and parallelism within runtime microarchitecture, while preserving memory semantics of an original sequential program, including preservation of dependencies between memory operations that should occur in a certain order. The disclosed microarchitecture, for example, enables parallelization and acceleration of legacy sequential codes within acceleration hardware, facilitating the acceleration of software applications.

In one embodiment, an integrated circuit includes memory ordering circuitry coupled to a memory subsystem and to acceleration hardware of processing components. A processor executing corresponding instructions may request memory operations to the memory subsystem out of program order. The memory ordering circuitry of the disclosed architecture may ensure that, as the acceleration hardware executes a sub-program corresponding to instructions of a program, results of corresponding memory operations are ordered in sequential order of the program. To ensure memory operations are scheduled and executed in program order, the memory ordering circuitry may include a directed logical channel formed between predecessor and successor memory operations, and a dependency token may be passed in association with an address within this channel to indicate dependency to a subsequent memory operation. This directed logical channel may be referred to as queue herein, which may be implemented with various hardware structures as will be explained. The location within this logical channel and of an associated dependency token may be tracked, depending on operation type, using memory arguments within queued memory operations.

For example, the memory ordering circuitry may queue the memory operations in an operations queue. The memory ordering circuitry may also receive, from the acceleration hardware in an input queue, addresses in whatever order the acceleration hardware executes and delivers the addresses for the memory operations. For example, for a load operation, a load address queue may receive an address from which to retrieve data from the memory. Similarly, for a store operation, a store address queue may receive an address to which to write data to the memory, and a store data queue to buffer data to be written to that address. By separating the buffering of addresses from the buffering of data, store operations may be performed in two phases: first to schedule a store operation to a particular address, and second, to request the store operation upon receipt of the data to be stored.

Furthermore, disclosed architecturally-defined memory operations may be capable of honoring memory ordering constraints through the manipulation of dependency tokens. Use of dependency tokens may ensure retention of data dependency of a memory operation within a program with a preceding memory operation. A memory operation may trigger generation of a dependency token upon the result of the operation becoming available to other memory operations. This generation may include the option of passing on a dependency token received from a preceding memory operation, such as duplication of that dependency token. These tokens are then passed to program-subsequent memory operations in a spatial execution graph representing the program. Upon the reception of a dependency token from a preceding memory operation, the subsequent operation is enabled for scheduling. In one embodiment, a counter may be used to track how many dependency tokens have been generated for any given channel, e.g., providing a compact representation of a queue. A counter that saturates, and thus cannot provide an additional unique token to those already passed to pending memory operations, may trigger a stall in scheduling an immediately preceding operation. The ordering of memory operations produced by a compiler, or the program memory graph, ensures that program memory order is honored within parallel-executing acceleration hardware such as spatial fabric.

Accordingly, as a dependency token is received from the acceleration hardware with an incoming address in the memory, the ordering of an associated memory operation may be scheduled and ultimately executed in program order. In one example, a dependency exists between a store operation and a preceding load operation when the store is to the same address in memory as the load operation. A dependency token may be generated (or duplicated) to be passed with the load operation, so that ordering circuitry may schedule completion of the load operation (that carries the dependency token) before that of the store operation. Ordering the store operation before the load operation in this example may avoid the scenario in which the store operation eliminates existing data before the load operation has a chance to read the existing data. Similarly, a dependency may exist between a load operation and a prior store operation to the same address in memory. In this case, the prior store operation may need to complete writing to the address before the load operation can read the correct data from that same address. Furthermore, load-load and store-store dependencies may also exist for which dependency tokens may facilitate in-order scheduling and completion of serial load operations or serial store operations, respectively.

In one embodiment, the disclosed microarchitecture may include a memory interface coupled to a memory subsystem, which includes a memory to store data corresponding to instructions being executed for a program. The microarchitecture may also include an operations queue to buffer memory operations corresponding to the instructions, and a acceleration hardware of processing components that are to execute a sub-program corresponding to the instructions. The microarchitecture may also include a set of input queues, coupled to the acceleration hardware, including an address queue to receive an address of the memory, the address associated with a second memory operation of the memory operations, and a dependency queue to receive a dependency token associated with the address. As discussed, the dependency token may indicate a dependency on data generated by a first memory operation, of the memory operations, which precedes the second memory operation. The microarchitecture may further include a scheduler circuit to schedule issuance of the second memory operation to the memory in response to the dependency queue receiving the dependency token and the address queue receiving the address. In one embodiment, the scheduler circuit is part of an operations manager circuit, and the operations manager circuit is to issue the second memory operation to the memory in response to completion of the first memory operation. In various embodiments, the first memory operation is either a load operation or a store operation and the second memory operation is either a load operation or a store operation. The present embodiments may also be extended to additional operations such as a fence operation that indicates when a group of prior loads or stores have completed.

FIG. 1A is a block diagram of a system 100 that employs a memory ordering circuit 105 interposed between a memory subsystem 110 and acceleration hardware 102, according to an embodiment of the present disclosure. The memory subsystem 110 may include known memory components, including cache, memory, and one or more memory controller(s) associated with a processor-based architecture. The acceleration hardware 102 may be coarse-grained spatial architecture made up of lightweight processing elements (or other types of processing components) connected by an inter-processing element (PE) network or another type of inter-component network.

In one embodiment, programs, viewed as control data flow graphs, are mapped onto the spatial architecture by configuring PEs and a communications network. Generally, PEs are configured as dataflow operators, similar to functional units in a processor: once the input operands arrive at the PE, some operation occurs, and results are forwarded to downstream PEs in a pipelined fashion. Dataflow operators (or other types of operators) may choose to consume incoming data on a per-operator basis. Simple operators, like those handling the unconditional evaluation of arithmetic expressions often consume all incoming data. It is sometimes useful, however, for operators to maintain state, for example, in accumulation.

The PEs communicate using dedicated virtual circuits, which are formed by statically configuring a circuit-switched communications network. These virtual circuits are flow controlled and fully back pressured, such that PEs will stall if either the source has no data or the destination is full. At runtime, data flows through the PEs implementing a mapped algorithm according to a data-flow graph, also referred to as a subprogram herein. For example, data may be streamed in from memory, through the acceleration hardware 102, and then back out to memory. Such an architecture can achieve remarkable performance efficiency relative to traditional multicore processors: compute, in the form of PEs, is simpler and more numerous than larger cores and communication is direct, as opposed to an extension of the memory subsystem 110. Memory system parallelism, however, helps to support parallel PE computation. If memory accesses are serialized, high parallelism is likely unachievable. To facilitate parallelism of memory accesses, the disclosed memory ordering circuit 105 includes memory ordering architecture and microarchitecture, as will be explained in detail. In one embodiment, the memory ordering circuit 105 is a request address file circuit (or "RAF") or other memory request circuitry.

Figure 1B:
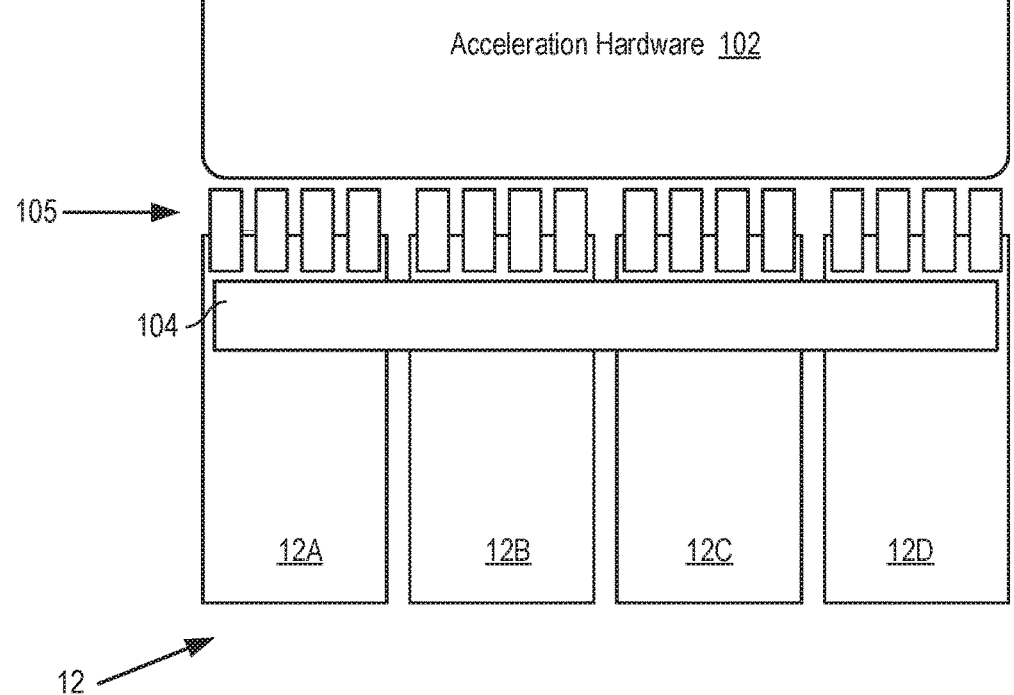
FIG. 1B is a block diagram of the system of FIG. 1A, but which employs multiple memory ordering circuits, according to an embodiment of the present disclosure.

FIG. 1B is a block diagram of the system 100 of FIG. 1A but which employs multiple memory ordering circuits 105, according to an embodiment of the present disclosure. Each memory ordering circuit 105 may function as an interface between the memory subsystem 110 and a portion of the acceleration hardware 102. The memory subsystem 110 may include a plurality of cache slices 12 (e.g., cache slices 12A, 12B, 12C, and 12D in the embodiment of FIG. 1B), and a certain number of memory ordering circuits 105 (four in this embodiment) may be used for each cache slice 12. A crossbar 104 may connect the memory ordering circuits 105 to banks of cache that make up each cache slice 12A, 12B, 12C, and 12D. For example, there may be eight banks of memory in each cache slice in one embodiment. The system 100 may be instantiated on a single die, for example, as a system on a chip (SoC). In one embodiment, the SoC includes the acceleration hardware 102. In an alternative embodiment, the acceleration hardware 102 is an external programmable chip such as an FPGA or CGRA, and the memory ordering circuits 105 interface with the acceleration hardware 102 through an input/output hub or the like.

Each memory ordering circuit 105 may accept read and write requests to the memory subsystem 110. The requests from the acceleration hardware 102 arrive at the memory ordering circuit 105 in a separate channel for each node of the data-flow graph that initiates read or write accesses, also referred to as load or store accesses herein. Buffering is provided so that the processing of loads will return the requested data to the acceleration hardware 102 in the order it was requested. In other words, iteration six data is returned before iteration seven data, and so forth. Furthermore, note that the request channel from a memory ordering circuit 105 to a particular cache bank may be implemented as an ordered channel and any first request that leaves before a second request will arrive at the cache bank before the second request.

Figure 2:
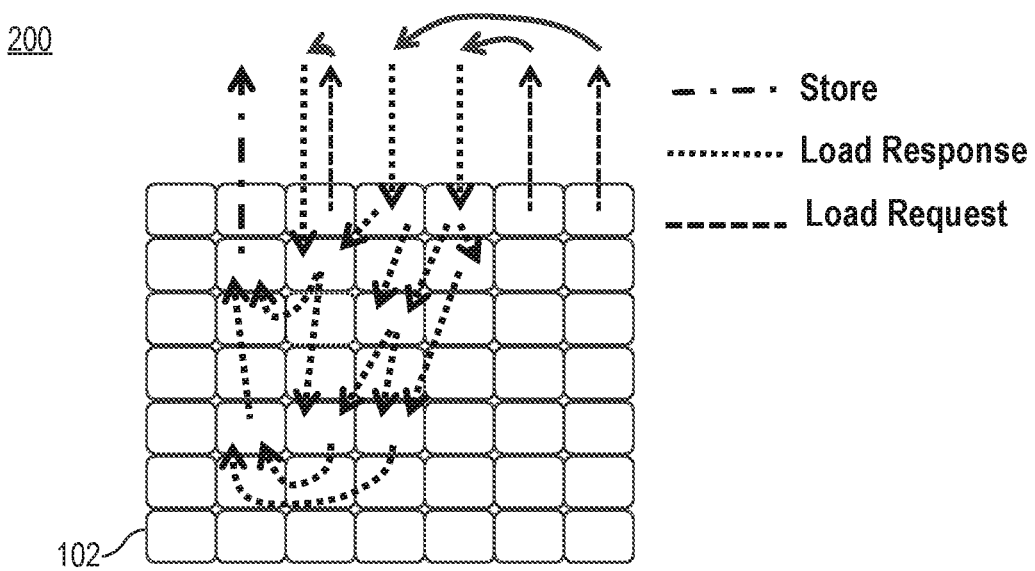
FIG. 2 is a block diagram illustrating general functioning of memory operations into and out of acceleration hardware, according to an embodiment of the present disclosure.

FIG. 2 is a block diagram 200 illustrating general functioning of memory operations into and out of the acceleration hardware 102, according to an embodiment of the present disclosure. The operations occurring out the top of the acceleration hardware 102 are understood to be made to and from a memory of the memory subsystem 110. Note that two load requests are made, followed by corresponding load responses. While the acceleration hardware 102 performs processing on data from the load responses, a third load request and response occur, which trigger additional acceleration hardware processing. The results of the acceleration hardware processing for these three load operations are then passed into a store operation, and thus a final result is stored back to memory.

By considering this sequence of operations, it may be evident that spatial arrays more naturally map to channels. Furthermore, the acceleration hardware 102 is latency-insensitive in terms of the request and response channels, and inherent parallel processing that may occur. The acceleration hardware may also decouple execution of a program from implementation of the memory subsystem 110 (FIG. 1A), as interfacing with the memory occurs at discrete moments separate from multiple processing steps taken by the acceleration hardware 102. For example, a load request to and a load response from memory are separate actions, and may be scheduled differently in different circumstances depending on dependency flow of memory operations. The use of spatial fabric, for example, for processing instructions facilitates spatial separation and distribution of such a load request and a load response.

Figure 3:
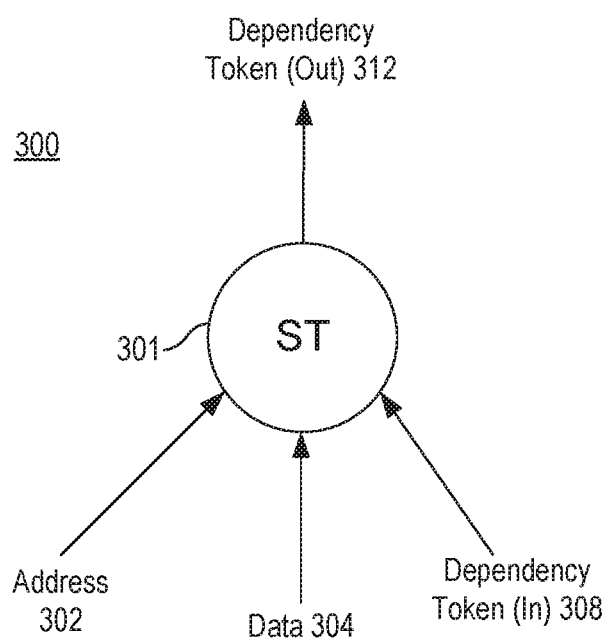
FIG. 3 is a block diagram illustrating a spatial dependency flow for a store operation, according to an embodiment of the present disclosure.

FIG. 3 is a block diagram 300 illustrating a spatial dependency flow for a store operation 301, according to an embodiment of the present disclosure. Reference to a store operation is exemplary, as the same flow may apply to a load operation (but without incoming data), or to other operators such as a fence. A fence is an ordering operation for memory subsystems that ensures that all prior memory operations of a type (such as all stores or all loads) have completed. The store operation 301 may receive an address 302 (of memory) and data 304 received from the acceleration hardware 102. The store operation 301 may also receive an incoming dependency token 308, and in response to the availability of these three items, the store operation 301 may generate an outgoing dependency token 312. The incoming dependency token, which may, for example, be an initial dependency token of a program, may be provided in a compiler-supplied configuration for the program, or may be provided by execution of memory-mapped input/output (I/O). Alternatively, if the program has already been running, the incoming dependency token 308 may be received from the acceleration hardware 102, e.g., in association with a preceding memory operation from which the store operation 301 depends. The outgoing dependency token 312 may be generated based on the address 302 and data 304 being required by a program-subsequent memory operation.

Figure 4:
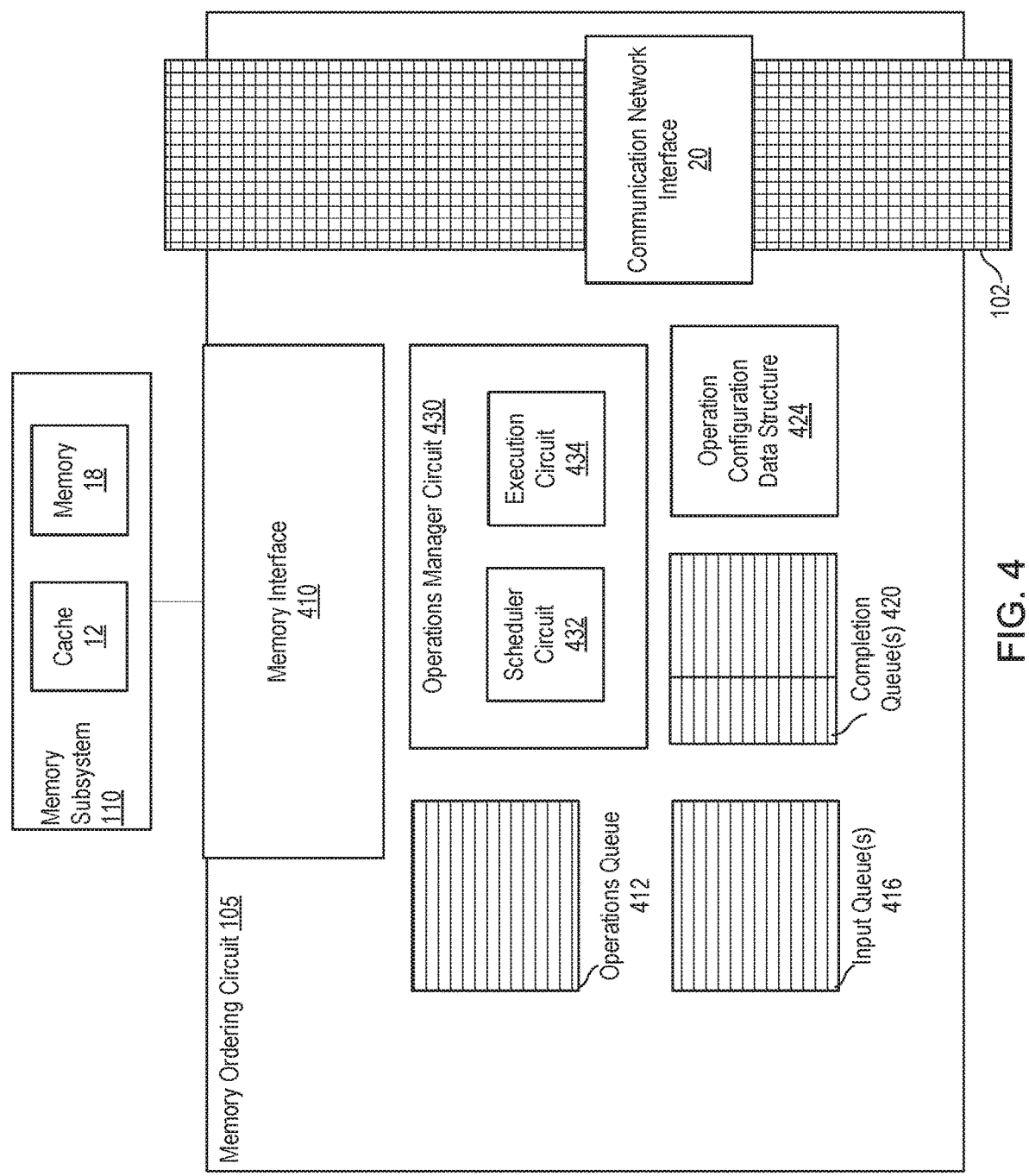
FIG. 4 is a detailed block diagram of the memory ordering circuit of FIG. 1, according to an embodiment of the present disclosure.

FIG. 4 is a detailed block diagram of the memory ordering circuit 105 of FIG. 1A, according to an embodiment of the present disclosure. The memory ordering circuit 105 may be coupled to an out-of-order memory subsystem 110, which as discussed, may include cache 12 and memory 18, and associated out-of-order memory controller(s). The memory ordering circuit 105 may include, or be coupled to, a communications network interface 20 that may be either an inter-tile or an intra-tile network interface, and may be a circuit switched network interface (as illustrated), and thus include circuit-switched interconnects. Alternatively, or additionally, the communications network interface 20 may include packet-switched interconnects.

The memory ordering circuit 105 may further include, but not be limited to, a memory interface 410, an operations queue 412, input queue(s) 416, a completion queue 420, an operation configuration data structure 424, and an operations manager circuit 430 that may further include a scheduler circuit 432 and an execution circuit 434. In one embodiment, the memory interface 410 may be circuit-switched, and in another embodiment, the memory interface 410 may be packet-switched, or both may exist simultaneously. The operations queue 412 may buffer memory operations (with corresponding arguments) that are being processed for request, and may, therefore, correspond to addresses and data coming into the input queues 416.

More specifically, the input queues 416 may be an aggregation of at least the following: a load address queue, a store address queue, a store data queue, and a dependency queue. When implementing the input queue 416 as aggregated, the memory ordering circuit 105 may provide for sharing of logical queues, with additional control logic to logically separate the queues, which are individual channels to the memory ordering circuit. This may maximize input queue usage, but may also require additional complexity and space for the logic circuitry to manage the logical separation of the aggregated queue. Alternatively, as will be discussed with reference to FIG. 5, the input queues 416 may be implemented in a segregated fashion, with a separate hardware queue for each. Whether aggregated (FIG. 4) or disaggregated (FIG. 5), implementation for purposes of this disclosure is substantially the same, with the former using additional logic to logically separate the queues within a single, shared hardware queue.

When shared, the input queues 416 and the completion queue 420 may be implemented as ring buffers of a fixed size. A ring buffer is an efficient implementation of f circular queue that has a first-in-first-out (FIFO) data characteristic. These queues may, therefore, enforce a semantical order of a program for which the memory operations are being requested. In one embodiment, a ring buffer (such as for the store address queue) may have entries corresponding to entries flowing through an associated queue (such as the store data queue or the dependency queue) at the same rate. In this way, a store address may remain associated with corresponding store data.

More specifically, the load address queue may buffer an incoming address of the memory 18 from which to retrieve data. The store address queue may buffer an incoming address of the memory 18 to which to write data, which is buffered in the store data queue. The dependency queue may buffer dependency tokens in association with the addresses of the load address queue and the store address queue. Each queue, representing a separate channel, may be implemented with a fixed or dynamic number of entries. When fixed, the more entries that are available, the more efficient complicated loop processing may be made. But, having too many entries costs more area and energy to implement. In some cases, e.g., with the aggregated architecture, the disclosed input queue 416 may share queue slots. Use of the slots in a queue may be statically allocated.

The completion queue 420 may be a separate set of queues to buffer data received from memory in response to memory commands issued by load operations. The completion queue 420 may be used to hold a load operation that has been scheduled but for which data has not yet been received (and thus has not yet completed). The completion queue 420, may therefore, be used to reorder data and operation flow.

The operations manager circuit 430, which will be explained in more detail with reference to FIGS. 5 through 13, may provide logic for scheduling and executing queued memory operations when taking into account dependency tokens used to provide correct ordering of the memory operations. The operation manager 430 may access the operation configuration data structure 424 to determine which queues are grouped together to form a given memory operation. For example, the operation configuration data structure 424 may include that a specific dependency counter (or queue), input queue, output queue, and completion queue are all grouped together for a particular memory operation. As each successive memory operation may be assigned a different group of queues, access to varying queues may be interleaved across a sub-program of memory operations. Knowing all of these queues, the operations manager circuit 430 may interface with the operations queue 412, the input queue(s) 416, the completion queue(s) 420, and the memory subsystem 110 to initially issue memory operations to the memory subsystem 110 when successive memory operations become "executable," and to next complete the memory operation with some acknowledgement from the memory subsystem. This acknowledgement may be, for example, data in response to a load operation command or an acknowledgement of data being stored in the memory in response to a store operation command.

Figure 5:
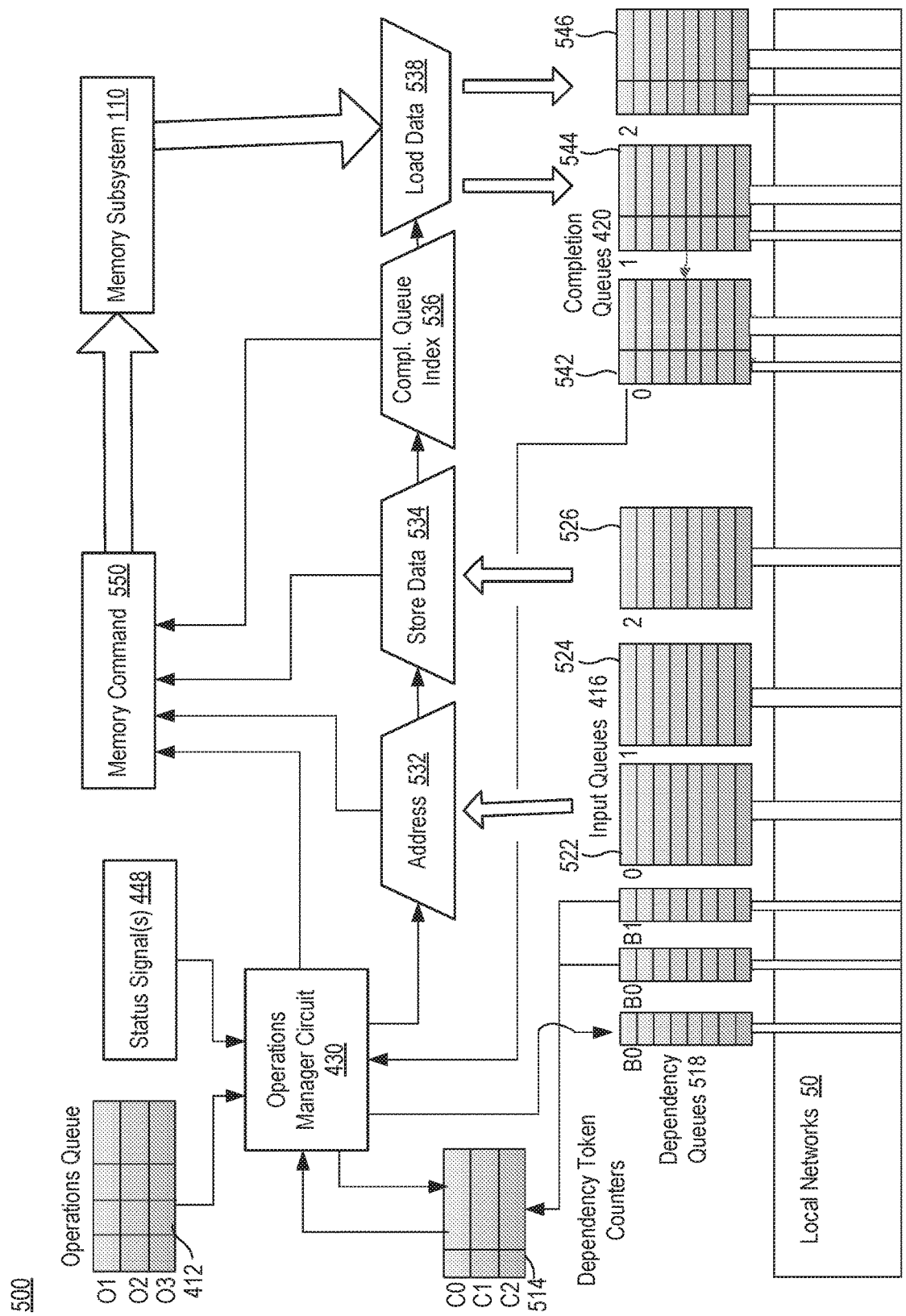
FIG. 5 is a flow diagram of a microarchitecture of the memory ordering circuit of FIG. 1, according to an embodiment of the present disclosure.

FIG. 5 is a flow diagram of a microarchitecture 500 of the memory ordering circuit 105 of FIG. 1A, according to an embodiment of the present disclosure. The memory subsystem 110 may allow illegal execution of a program in which ordering of memory operations is wrong, due to the semantics of C language (and other object-oriented program languages). The microarchitecture 500 may enforce the ordering of the memory operations (sequences of loads from and stores to memory) so that results of instructions that the acceleration hardware 102 executes are properly ordered. A number of local networks 50 are illustrated to represent a portion of the acceleration hardware 102 coupled to the microarchitecture 500.

From an architectural perspective, there are at least two goals: first, to run general sequential codes correctly, and second, to obtain high performance in the memory operations performed by the microarchitecture 500. To ensure program correctness, the compiler expresses the dependency between the store operation and the load operation to an array, p, in some fashion, which are expressed via dependency tokens as will be explained. To improve performance, the microarchitecture 500 finds and issues as many load commands of an array in parallel as is legal with respect to program order.

In one embodiment, the microarchitecture 500 may include the operations queue 412, the input queues 416, the completion queues 420, and the operations manager circuit 430 discussed with reference to FIG. 4, above, where individual queues may be referred to as channels. The microarchitecture 500 may further include a plurality of dependency token counters 514 (e.g., one per input queue), a set of dependency queues 518 (e.g., one each per input queue), an address multiplexer 532, a store data multiplexer 534, a completion queue index multiplexer 536, and a load data multiplexer 538. The operations manager circuit 430, in one embodiment, may direct these various multiplexers in generating a memory command 550 (to be sent to the memory subsystem 110) and in receipt of responses of load commands back from the memory subsystem 110, as will be explained.

The input queues 416, as mentioned, may include a load address queue 522, a store address queue 524, and a store data queue 526. (The small numbers 0, 1, 2 are channel labels and will be referred to later in FIG. 8 and FIG. 11A.) In various embodiments, these input queues may be multiplied to contain additional channels, to handle additional parallelization of memory operation processing. Each dependency queue 518 may be associated with one of the input queues 416. More specifically, the dependency queue 518 labeled B0 may be associated with the load address queue 522 and the dependency queue labeled B1 may be associated with the store address queue 524. If additional channels of the input queues 416 are provided, the dependency queues 518 may include additional, corresponding channels.

In one embodiment, the completion queues 420 may include a set of output buffers 544 and 546 for receipt of load data from the memory subsystem 110 and a completion queue 542 to buffer addresses and data for load operations according to an index maintained by the operations manager circuit 430. The operations manager circuit 430 can manage the index to ensure in-order execution of the load operations, and to identify data received into the output buffers 544 and 546 that may be moved to scheduled load operations in the completion queue 542.

More specifically, because the memory subsystem 110 is out of order, but the acceleration hardware 102 completes operations in order, the microarchitecture 500 may re-order memory operations with use of the completion queue 542. Three different sub-operations may be performed in relation to the completion queue 542, namely to allocate, enqueue, and dequeue. For allocation, the operations manager circuit 430 may allocate an index into the completion queue 542 in an in-order next slot of the completion queue. The operations manager circuit may provide this index to the memory subsystem 110, which may then know the slot to which to write data for a load operation. To enqueue, the memory subsystem 110 may write data as an entry to the indexed, in-order next slot in the completion queue 542 like random access memory (RAM), setting a status bit of the entry to valid. To dequeue, the operations manager circuit 430 may present the data stored in this in-order next slot to complete the load operation, setting the status bit of the entry to invalid. Invalid entries may then be available for a new allocation.

In one embodiment, the status signals 448 may refer to statuses of the input queues 416, the completion queues 420, the dependency queues 518, and the dependency token counters 514. These statuses, for example, may include an input status, an output status, and a control status, which may refer to the presence or absence of a dependency token in association with an input or an output. The input status may include the presence or absence of addresses and the output status may include the presence or absence of store values and available completion buffer slots. The dependency token counters 514 may be a compact representation of a queue and track a number of dependency tokens used for any given input queue. If the dependency token counters 514 saturate, no additional dependency tokens may be generated for new memory operations. Accordingly, the memory ordering circuit 105 may stall scheduling new memory operations until the dependency token counters 514 becomes unsaturated.

Figure 6:
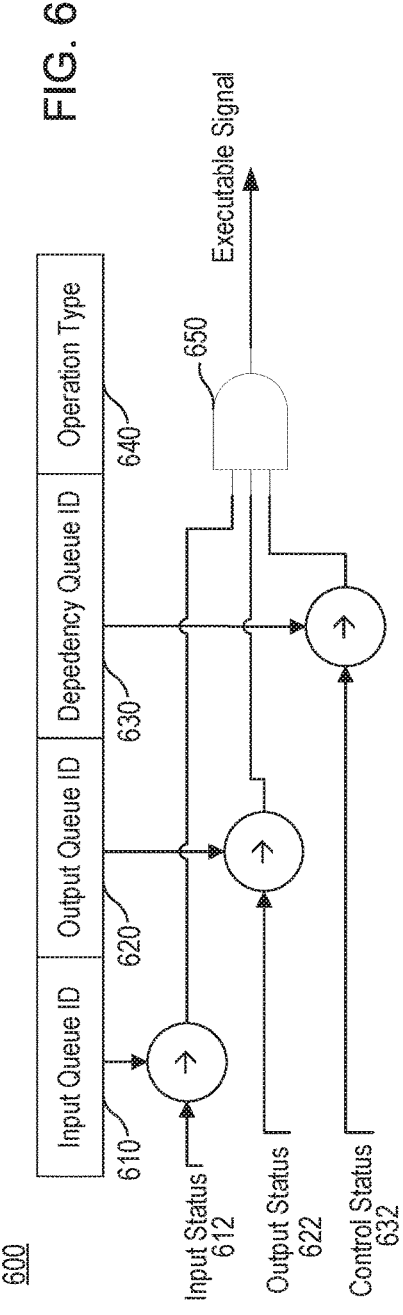
FIG. 6 is a block diagram of an executable determiner circuit, according to an embodiment of the present disclosure.

With additional reference to FIG. 6, FIG. 6 is a block diagram of an executable determiner circuit 600, according to an embodiment of the present disclosure. The memory ordering circuit 105 may be set up with several different kinds of memory operations, for example a load and a store:

ldNo[d,x] result.outN, addr.in64, order.in0, order.out0
stNo[d,x] addr.in64, data.inN, order.in0, order.out0

The executable determiner circuit 600 may be integrated as a part of the scheduler circuit 432 and which may perform a logical operation to determine whether a given memory operation is executable, and thus ready to be issued to memory. A memory operation may be executed when the queues corresponding to its memory arguments have data and an associated dependency token is present. These memory arguments may include, for example, an input queue identifier 610 (indicative of a channel of the input queue 416), an output queue identifier 620 (indicative of a channel of the completion queues 420), a dependency queue identifier 630 (e.g., what dependency queue or counter should be referenced), and an operation type indicator 640 (e.g., load operation or store operation). These memory arguments may be queued within the operations queue 412, and used to schedule issuance of memory operations in association with incoming addresses and data from memory and the acceleration hardware 102. (See FIG. 7.) Incoming status signals 448 may be logically combined with these identifiers and then the results may be added (e.g., through an AND gate 650) to output an executable signal, e.g., which is asserted when the memory operation is executable. The incoming status signals 448 may include an input status 612 for the input queue identifier 610, an output status 622 for the output queue identifier 620, and a control status 632 (related to dependency tokens) for the dependency queue identifier 630.

For a load operation, and by way of example, the memory ordering circuit 105 may issue a load command when the load operation has an address (input status) and room to buffer the load result in the completion queue 542 (output status). Similarly, the memory ordering circuit 105 may issue a store command for a store operation when the store operation has both an address and data value (input status). Accordingly, the status signals 448 may communicate a level of emptiness (or fullness) of the queues to which the status signals pertain. The operation type may then dictate whether the logic results in an executable signal depending on what address and data should be available.

To implement dependency ordering, the scheduler circuit 432 may extend memory operations to include dependency tokens as underlined above in the example load and store operations. The control status 632 may indicate whether a dependency token is available within the dependency queue identified by the dependency queue identifier 630, which could be one of the dependency queues 518 (for an incoming memory operation) or a dependency token counter 514 (for a completed memory operation). Under this formulation, a dependent memory operation requires an additional ordering token to execute and generates an additional ordering token upon completion of the memory operation, where completion means that data from the result of the memory operation has become available to program-subsequent memory operations.

In one embodiment, with further reference to FIG. 5, the operations manager circuit 430 may direct the address multiplexer 532 to select an address argument that is buffered within either the load address queue 522 or the store address queue 524, depending on whether a load operation or a store operation is currently being scheduled for execution. If it is a store operation, the operations manager circuit 430 may also direct the store data multiplexer 534 to select corresponding data from the store data queue 526. The operations manager circuit 430 may also direct the completion queue index multiplexer 536 to retrieve a load operation entry, indexed according to queue status and/or program order, within the completion queues 420, to complete a load operation. The operations manager circuit 430 may also direct the load data multiplexer 538 to select data received from the memory subsystem 110 into the completion queues 420 for a load operation that is awaiting completion. In this way, the operations manager circuit 430 may direct selection of inputs that go into forming the memory command 550, e.g., a load command or a store command, or that the execution circuit 434 is waiting for to complete a memory operation.

Figure 7:
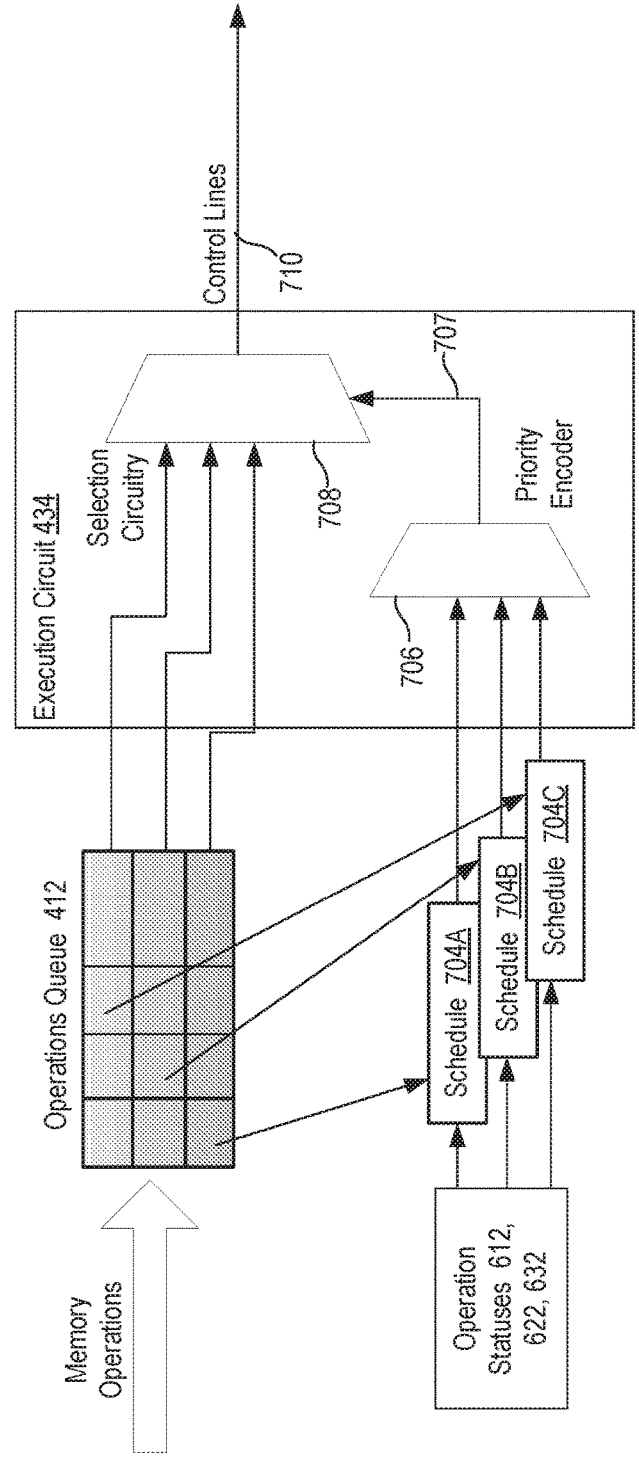
FIG. 7 is a block diagram of a priority encoder, according to an embodiment of the present disclosure.

FIG. 7 is a block diagram the execution circuit 434 that may include a priority encoder 706 and selection circuitry 708 and which generates output control line(s) 710, according to one embodiment of the present disclosure. In one embodiment, the execution circuit 434 may access queued memory operations (in the operations queue 412) that have been determined to be executable (FIG. 6). The execution circuit 434 may also receive the schedules 704A, 704B, 704C for multiple of the queued memory operations that have been queued and also indicated as ready to issue to memory. The priority encoder 706 may thus receive an identity of the executable memory operations that have been scheduled and execute certain rules (or follow particular logic) to select the memory operation from those coming in that has priority to be executed first. The priority encoder 706 may output a selector signal 707 that identifies the scheduled memory operation that has a highest priority, and has thus been selected.

The priority encoder 706, for example, may be a circuit (such as a state machine or a simpler converter) that compresses multiple binary inputs into a smaller number of outputs, including possibly just one output. The output of a priority encoder is the binary representation of the original number starting from zero of the most significant input bit. So, in one example, when memory operation 0 ("zero"), memory operation one ("1"), and memory operation two ("2") are executable and scheduled, corresponding to 704A, 704B, and 704C, respectively. The priority encoder 706 may be configured to output the selector signal 707 to the selection circuitry 708 indicating the memory operation zero as the memory operation that has highest priority. The selection circuitry 708 may be a multiplexer in one embodiment, and be configured to output its selection (e.g., of memory operation zero) onto the control lines 710, as a control signal, in response to the selector signal from the priority encoder 706 (and indicative of selection of memory operation of highest priority). This control signal may go to the multiplexers 532, 534, 536, and/or 538, as discussed with reference to FIG. 5, to populate the memory command 550 that is next to issue (be sent) to the memory subsystem 110. The transmittal of the memory command may be understood to be issuance of a memory operation to the memory subsystem 110.

FIG. 8 is a block diagram of an exemplary load operation 800, both logical and in binary form, according to an embodiment of the present disclosure. Referring back to FIG. 6, the logical representation of the load operation 800 may include channel zero ("0") (corresponding to the load address queue 522) as the input queue identifier 610 and completion channel one ("1") (corresponding to the output buffer 544) as the output queue identifier 620. The dependency queue identifier 630 may include two identifiers, channel B0 (corresponding to the first of the dependency queues 518) for incoming dependency tokens and counter C0 for outgoing dependency tokens. The operation type 640 has an indication of "Load," which could be a numerical indicator as well, to indicate the memory operation is a load operation. Below the logical representation of the logical memory operation is a binary representation for exemplary purposes, e.g., where a load is indicated by "00." The load operation of FIG. 8 may be extended to include other configurations such as a store operation (FIG. 10A) or other type of memory operations, such as a fence.

An example of memory ordering by the memory ordering circuit 105 will be illustrated with a simplified example for purposes of explanation with relation to FIGS. 9A-9B, 10A-10B, and 11A-11G. For this example, the following code includes an array, p, which is accessed by indices i and i+2:

```
for(i) {
    temp = p[i];
    p[i+2] = temp;
}
```

Assume, for this example, that array p contains 0, 1, 2, 3, 4, 5, 6, and at the end of loop execution, array p will contain 0, 1, 0, 1, 0, 1, 0. This code may be transformed by unrolling the loop, as illustrated in FIGS. 9A and 9B. True address dependencies are annotated by arrows in FIG. 9A, which in each case, a load operation is dependent on a store operation to the same address. For example, for the first of such dependencies, a store (e.g., a write) to p[2] needs to occur before a load (e.g., a read) from p[2], and second of such dependencies, a store to p[3] needs to occur before a load from p[3], and so forth. As a compiler is to be pessimistic, the compiler annotates dependencies between two memory operations, load p[i] and store p[i+2]. Note that only sometimes do reads and writes conflict. The micro-architecture 500 is designed to extract memory-level parallelism where memory operations may move forward at the same time when there are no conflicts to the same address. This is especially the case for load operations, which expose latency in code execution due to waiting for preceding dependent store operations to complete. In the example code in FIG. 9B, safe reorderings are noted by the arrows on the left of the unfolded code.

The way the microarchitecture may perform this reordering is discussed with reference to FIGS. 10A-10B and 11A-11G. Note that this approach is not as optimal as possible because the microarchitecture 500 may not send a memory command to memory every cycle. However, with minimal hardware, the microarchitecture supports dependency flows by executing memory operations when operands (e.g., address and data, for a store, or address for a load) and dependency tokens are available.

FIG. 10A is a block diagram of exemplary memory arguments for a load operation 1002 and for a store operation 1004, according to an embodiment of the present disclosure. These, or similar, memory arguments were discussed with relation to FIG. 8 and will not be repeated here. Note, however, that the store operation 1004 has no indicator for the output queue identifier because no data is being output to the acceleration hardware 102. Instead, the store address in channel 1 and the data in channel 2 of the input queues 416, as identified in the input queue identifier memory argument, are to be scheduled for transmission to the memory subsystem 110 in a memory command to complete the store operation 1004. Furthermore, the input channels and output channels of the dependency queues are both implemented with counters. Because the load operations and the store operations as displayed in FIGS. 9A and 9B are interdependent, the counters may be cycled between the load operations and the store operations within the flow of the code.

FIG. 10B is a block diagram illustrating flow of the load operations and store operations, such as the load operation 1002 and the store 1004 operation of FIG. 9A, through the microarchitecture 500 of the memory ordering circuit of FIG. 5, according to an embodiment of the present disclosure. For simplicity of explanation, not all of the components are displayed, but reference may be made back to the additional components displayed in FIG. 5. Various ovals indicating "Load" for the load operation 1002 and "Store" for the store operation 1004 are overlaid on some of the components of the microarchitecture 500 as indication of how various channels of the queues are being used as the memory operations are queued and ordered through the microarchitecture 500.

FIGS. 11A, 11B, 11C, 11D, 11E, 11F, 11G, and 11H are block diagrams illustrating functional flow of load operations and store operations for the exemplary program of FIGS. 9A and 9B through queues of the microarchitecture of FIG. 10B, according to an embodiment of the present disclosure. Each figure may correspond to a next cycle of processing by the microarchitecture 500. Values that are italicized are incoming values (into the queues) and values that are bolded are outgoing values (out of the queues). All other values with normal fonts are retained values already existing in the queues.

Figure 11A:

In FIG. 11A, the address p[0] is incoming into the load address queue 522, and the address p[2] is incoming into the store address queue 524, starting the control flow process. Note that counter C0, for dependency input for the load address queue, is "1" and counter C1, for dependency output, is zero. In contrast, the "1" of C0 indicates a dependency out value for the store operation. This indicates an incoming dependency for the load operation of p[0] and an outgoing dependency for the store operation of p[2]. These values, however, are not yet active, but will become active, in this way, in FIG. 11B.

Figure 11B:
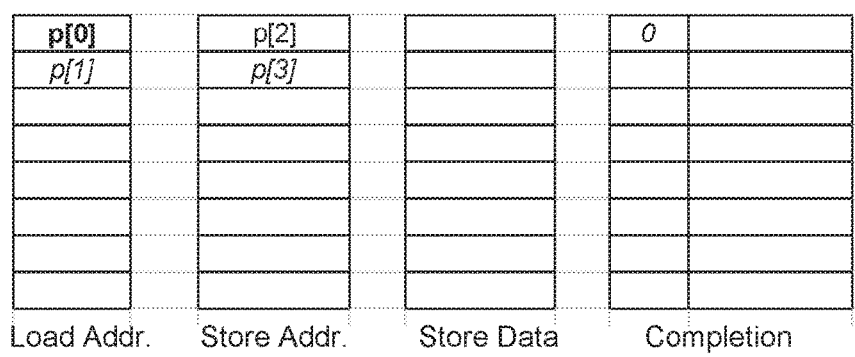

In FIG. 11B, address p[0] is bolded to indicate it is outgoing in this cycle. A new address p[1] is incoming into the load address queue and a new address p[3] is incoming into the store address queue. A zero ("0")-valued bit in the completion queue 542 is also incoming, which indicates any data present for that indexed entry is invalid. As mentioned, the values for the counters C0 and C1 are now indicated as incoming, and are thus now active this cycle.

Figure 11C:
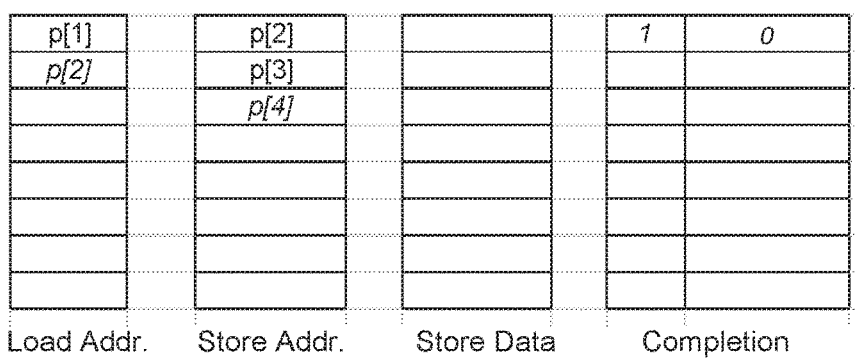

In FIG. 11C, the outgoing address p[0] has now left the load address queue and a new address p[2] is incoming into the load address queue. And, the data ("0") is incoming into the completion queue for address p[0]. The validity bit is set to "1" to indicate that the data in the completion queue is valid. Furthermore, a new address p[4] is incoming into the store address queue. The value for counter C0 is indicated as outgoing and the value for counter C1 is indicated as incoming. The value of "1" for C1 indicates an incoming dependency for store operation to address p[4].

Note that the address p[2] for the newest load operation is dependent on the value that first needs to be stored by the store operation for address p[2], which is at the top of the store address queue. Later, the indexed entry in the completion queue for the load operation from address p[2] may remain buffered until the data from the store operation to the address p[2] is completed (see FIGS. 11F-11H).

In FIG. 11D, the data ("0") is outgoing from the completion queue for address p[0], which is therefore being sent out to the acceleration hardware 102. Furthermore, a new address p[3] is incoming into the load address queue and a new address p[5] is incoming into the store address queue. The values for the counters C0 and C1 remain unchanged.

In FIG. 11E, the value ("0") for the address p[2] is incoming into the store data queue, while a new address p[4] comes into the load address queue and a new address p[6] comes into the store address queue. The counter values for C0 and C1 remain unchanged.

In FIG. 11F, the value ("0") for the address p[2] in the store data queue, and the address p[2] in the store address queue are both outgoing values. Likewise, the value for the counter C1 is indicated as outgoing, while the value ("0") for counter C0 remain unchanged. Furthermore, a new address p[5] is incoming into the load address queue and a new address p[7] is incoming into the store address queue.

In FIG. 11G, the value ("0") is incoming to indicate the indexed value within the completion queue 542 is invalid. The address p[1] is bolded to indicate it is outgoing from the load address queue while a new address p[6] is incoming into the load address queue. A new address p[8] is also incoming into the store address queue. The value of counter C0 is incoming as a "1," corresponding to an incoming dependency for the load operation of address p[6] and an outgoing dependency for the store operation of address p[8]. The value of counter C1 is now "0," and is indicated as outgoing.

In FIG. 11H, a data value of "1" is incoming into the completion queue 542 while the validity bit is also incoming as a "1," meaning that the buffered data is valid. This is the data needed to complete the load operation for p[2]. Recall that this data had to first be stored to address p[2], which happened in FIG. 11F. The value of "0" for counter C0 is outgoing, and a value of "1," for counter C1 is incoming. Furthermore, a new address p[7] is incoming into the load address queue and a new address p[9] is incoming into the store address queue.

In the present embodiment, the process of executing the code of FIGS. 9A and 9B may continue on with bouncing dependency tokens between "0" and "1" for the load operations and the store operations. This is due to the tight dependencies between p[i] and p[i+2]. Other code with less frequent dependencies may generate dependency tokens at a slower rate, and thus reset the counters C0 and C1 at a slower rate, causing the generation of tokens of higher values (corresponding to further semantically-separated memory operations).

Figure 12:
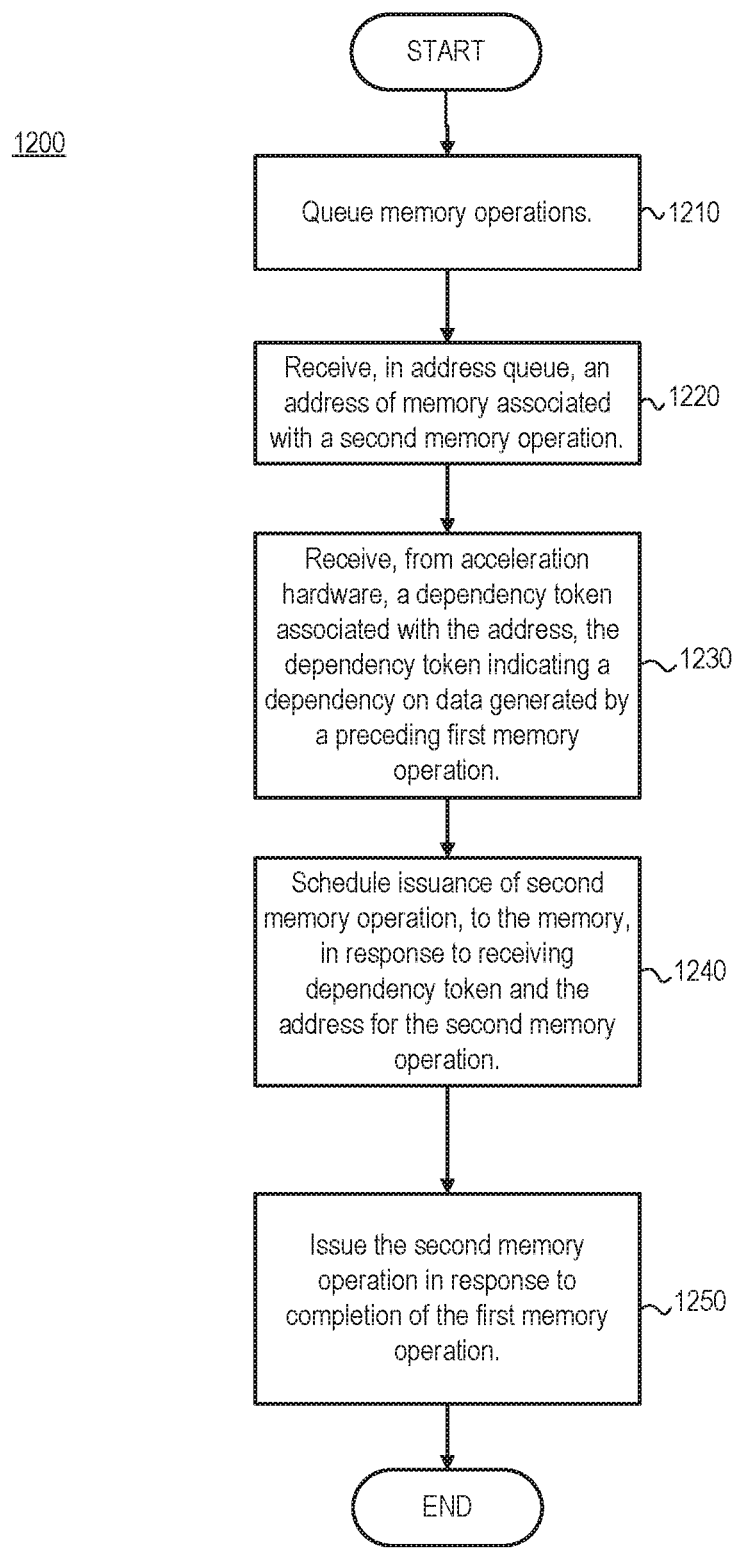
FIG. 12 is a flow chart of a method for ordering memory operations between a acceleration hardware and an out-of-order memory subsystem, according to an embodiment of the present disclosure.

FIG. 12 is a flow chart of a method 1200 for ordering memory operations between acceleration hardware and an out-of-order memory subsystem, according to an embodiment of the present disclosure. The method 1200 may be performed by a system that may include hardware (e.g., circuitry, dedicated logic, and/or programmable logic), software (e.g., instructions executable on a computer system to perform hardware simulation), or a combination thereof. In an illustrative example, the method 1200 may be performed by the memory ordering circuit 105 and various subcomponents of the memory ordering circuit 105.

More specifically, referring to FIG. 12, the method 1200 may start with the memory ordering circuit queuing memory operations in an operations queue of the memory ordering circuit (1210). Memory operation and control arguments may make up the memory operations, as queued, where the memory operation and control arguments are mapped to certain queues within the memory ordering circuit as discussed previously. The memory ordering circuit may work to issue the memory operations to a memory in association with acceleration hardware, to ensure the memory operations complete in program order. The method 1200 may continue with the memory ordering circuit receiving, in set of input queues, from the acceleration hardware, an address of the memory associated with a second memory operation of the memory operations (1220). In one embodiment, a load address queue of the set of input queues is the channel to receive the address. In another embodiment, a store address queue of the set of input queues is the channel to receive the address. The method 1200 may continue with the memory ordering circuit receiving, from the acceleration hardware, a dependency token associated with the address, wherein the dependency token indicates a dependency on data generated by a first memory operation, of the memory operations, which precedes the second memory operation (1230). In one embodiment, a channel of a dependency queue is to receive the dependency token. The first memory operation may be either a load operation or a store operation.

The method 1200 may continue with the memory ordering circuit scheduling issuance of the second memory operation to the memory in response to receiving the dependency token and the address associated with the dependency token (1240). For example, when the load address queue receives the address for an address argument of a load operation and the dependency queue receives the dependency token for a control argument of the load operation, the memory ordering circuit may schedule issuance of the second memory operation as a load operation. The method 1200 may continue with the memory ordering circuit issuing the second memory operation (e.g., in a command) to the memory in response to completion of the first memory operation (1250). For example, if the first memory operation is a store, completion may be verified by acknowledgement that the data in a store data queue of the set of input queues has been written to the address in the memory. Similarly, if the first memory operation is a load operation, completion may be verified by receipt of data from the memory for the load operation.

FIG. 13A is a block diagram illustrating a micro-architecture for a processor 1300 to perform operations of a processor or an integrated circuit that includes the memory subsystem 110 and the acceleration hardware 102 of FIGS. 1A-1B, according to an embodiment. Specifically, processor 1300 depicts an in-order architecture core and a register renaming logic, out-of-order issue/execution logic to be included in a processor according to at least one embodiment of the disclosure.

Processor 1300 includes a front end unit 1330 coupled to an execution engine unit 1350, and both are coupled to a memory unit 1370. The processor 1300 may include a reduced instruction set computing (RISC) core, a complex instruction set computing (CISC) core, a very long instruction word (VLIW) core, or a hybrid or alternative core type. As yet another option, processor 1300 may include a special-purpose core, such as, for example, a network or communication core, compression engine, graphics core, or the like. In one embodiment, processor 1300 may be a multi-core processor or may be part of a multi-processor system.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1340 may be implemented using various different mechanisms. Examples of suitable mechanisms include, but are not limited to, look-up tables, hardware implementations, programmable logic arrays (PLAs), microcode read only memories (ROMs), etc. The instruction cache unit 1334 is further coupled to the memory unit 1370. The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different scheduler circuits, including reservations stations (RS), central instruction window, etc. The scheduler unit(s) 1356 is coupled to the physical register set(s) unit(s) 1358. Each of the physical register set(s) units 1358 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 1358 is overlapped by the retirement unit 1354 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1354 and the physical register set(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1356, physical register set(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which may include a data prefetcher 1380, a data TLB unit 1372, a data cache unit (DCU) 1374, and a level 2 (L2) cache unit 1376, to name a few examples. In some embodiments DCU 1374 is also known as a first level data cache (L1 cache). The DCU 1374 may handle multiple outstanding cache misses and continue to service incoming stores and loads. It also supports maintaining cache coherency. The data TLB unit 1372 is a cache used to improve virtual address translation speed by mapping virtual and physical address spaces. In one exemplary embodiment, the memory access units 1364 may include a load unit, a store address unit, and a store data unit, each of which is coupled to the data TLB unit 1372 in the memory unit 1370. The L2 cache unit 1376 may be coupled to one or more other levels of cache and eventually to a main memory.

In one embodiment, the data prefetcher 1380 speculatively loads/prefetches data to the DCU 1374 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1300 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 1334, data cache unit 1374, and L2 cache unit 1376 would not generally implement the process described in this disclosure, as generally these cache units use on-die memory that does not exhibit page-locality behavior.

FIG. 13B is a block diagram illustrating an in-order pipeline and a register renaming stage, out-of-order issue/execution pipeline implemented by processor 1300 of FIG. 13A according to some embodiments of the disclosure. The solid lined boxes in FIG. 13B illustrate an in-order pipeline 1301, while the dashed lined boxes illustrate a register renaming, out-of-order issue/execution pipeline 1303. In FIG. 13B, the pipelines 1301 and 1303 include a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324. In some embodiments, the ordering of stages 1302-1324 may be different than illustrated and are not limited to the specific ordering shown in FIG. 13B.

Figure 14:
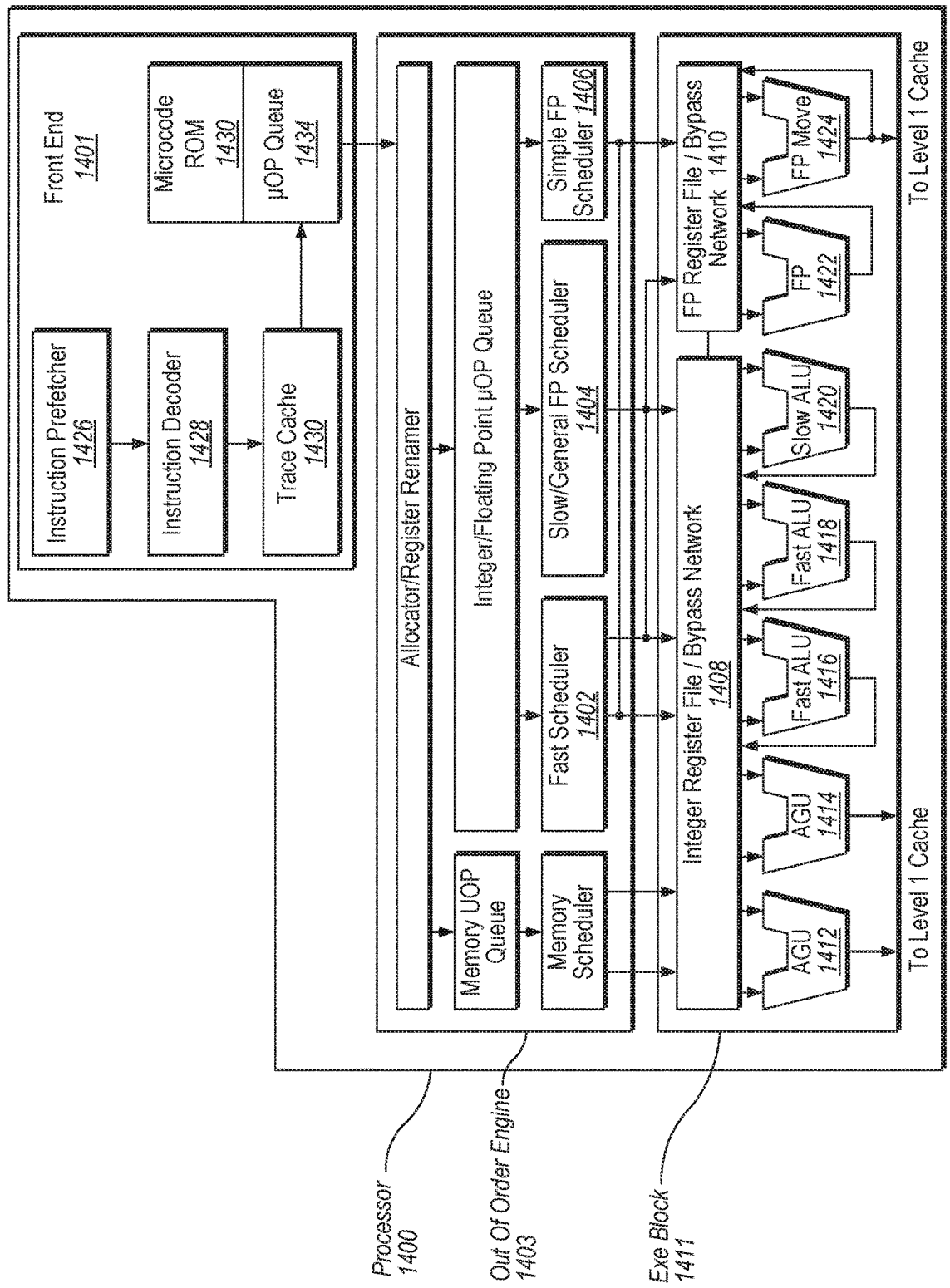
FIG. 14 illustrates a block diagram of the micro-architecture for a processor or an integrated circuit that includes the memory subsystem and the acceleration hardware of FIGS. 1A-1B, according to an embodiment of the present disclosure.

FIG. 14 illustrates a block diagram of the micro-architecture for a processor 1400 that includes logic circuits of a processor or an integrated circuit that includes the memory subsystem 110 and the acceleration hardware 102 of FIGS. 1A-1B, according to an embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1401 is the part of the processor 1400 that fetches instructions to be executed and prepares them to be used later in the processor pipeline. The embodiments of the page additions and content copying can be implemented in processor 1400.

The front end 1401 may include several units. In one embodiment, the instruction prefetcher 1416 fetches instructions from memory and feeds them to an instruction decoder 1418 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1430 takes decoded uops and assembles them into program ordered sequences or traces in the uop queue 1434 for execution. When the trace cache 1430 encounters a complex instruction, microcode ROM (or RAM) 1432 provides the uops needed to complete the operation.

Some instructions are converted into a single micro-op, whereas others need several micro-ops to complete the full operation. In one embodiment, if more than four micro-ops are needed to complete an instruction, the decoder 1418 accesses the microcode ROM 1432 to do the instruction. For one embodiment, an instruction can be decoded into a small number of micro ops for processing at the instruction decoder 1418. In another embodiment, an instruction can be stored within the microcode ROM 1432 should a number of micro-ops be needed to accomplish the operation. The trace cache 1430 refers to an entry point programmable logic array (PLA) to determine a correct micro-instruction pointer for reading the micro-code sequences to complete one or more instructions in accordance with one embodiment from the micro-code ROM 1432. After the microcode ROM 1432 finishes sequencing micro-ops for an instruction, the front end 1401 of the machine resumes fetching micro-ops from the trace cache 1430.

The out-of-order execution engine 1403 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1402, slow/general floating point scheduler 1404, and simple floating point scheduler 1406. The uop schedulers 1402, 1404, 1406, determine when a uop is ready to execute based on the readiness of their dependent input register operand sources and the availability of the execution resources the uops need to complete their operation. The fast scheduler 1402 of one embodiment can schedule on each half of the main clock cycle while the other schedulers can only schedule once per main processor clock cycle. The schedulers arbitrate for the dispatch ports to schedule uops for execution.

Register sets 1408, 1410, sit between the schedulers 1402, 1404, 1406, and the execution units 1412, 1414, 1416, 1418, 1420, 1422, 1424 in the execution block 1411. There is a separate register set 1408, 1410, for integer and floating point operations, respectively. Each register set 1408, 1410, of one embodiment also includes a bypass network that can bypass or forward just completed results that have not yet been written into the register set to new dependent uops. The integer register set 1408 and the floating point register set 1410 are also capable of communicating data with the other. For one embodiment, the integer register set 1408 is split into two separate register sets, one register set for the low order 32 bits of data and a second register set for the high order 32 bits of data. The floating point register set 1410 of one embodiment has 128 bit wide entries because floating point instructions typically have operands from 64 to 128 bits in width.

The execution block 1411 contains the execution units 1412, 1414, 1416, 1418, 1420, 1422, 1424, where the instructions are actually executed. This section includes the register sets 1408, 1410, that store the integer and floating point data operand values that the micro-instructions need to execute. The processor 1400 of one embodiment is comprised of a number of execution units: address generation unit (AGU) 1412, AGU 1414, fast ALU 1416, fast ALU 1418, slow ALU 1420, floating point ALU 1412, floating point move unit 1414. For one embodiment, the floating point execution blocks 1412, 1414, execute floating point, MMX, SIMD, and SSE, or other operations. The floating point ALU 1412 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1416, 1418. The fast ALUs 1416, 1418, of one embodiment can execute fast operations with an effective latency of half a clock cycle. For one embodiment, most complex integer operations go to the slow ALU 1420 as the slow ALU 1420 includes integer execution hardware for long latency type of operations, such as a multiplier, shifts, flag logic, and branch processing. Memory load/store operations are executed by the AGUs 1422, 1424. For one embodiment, the integer ALUs 1416, 1418, 1420, are described in the context of performing integer operations on 64 bit data operands. In alternative embodiments, the ALUs 1416, 1418, 1420, can be implemented to support a variety of data bits including 16, 32, 128, 256, etc. Similarly, the floating point units 1422, 1424, can be implemented to support a range of operands having bits of various widths. For one embodiment, the floating point units 1422, 1424, can operate on 128 bits wide packed data operands in conjunction with SIMD and multimedia instructions.

In one embodiment, the uops schedulers 1402, 1404, 1406, dispatch dependent operations before the parent load has finished executing. As uops are speculatively scheduled and executed in processor 1400, the processor 1400 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 15:
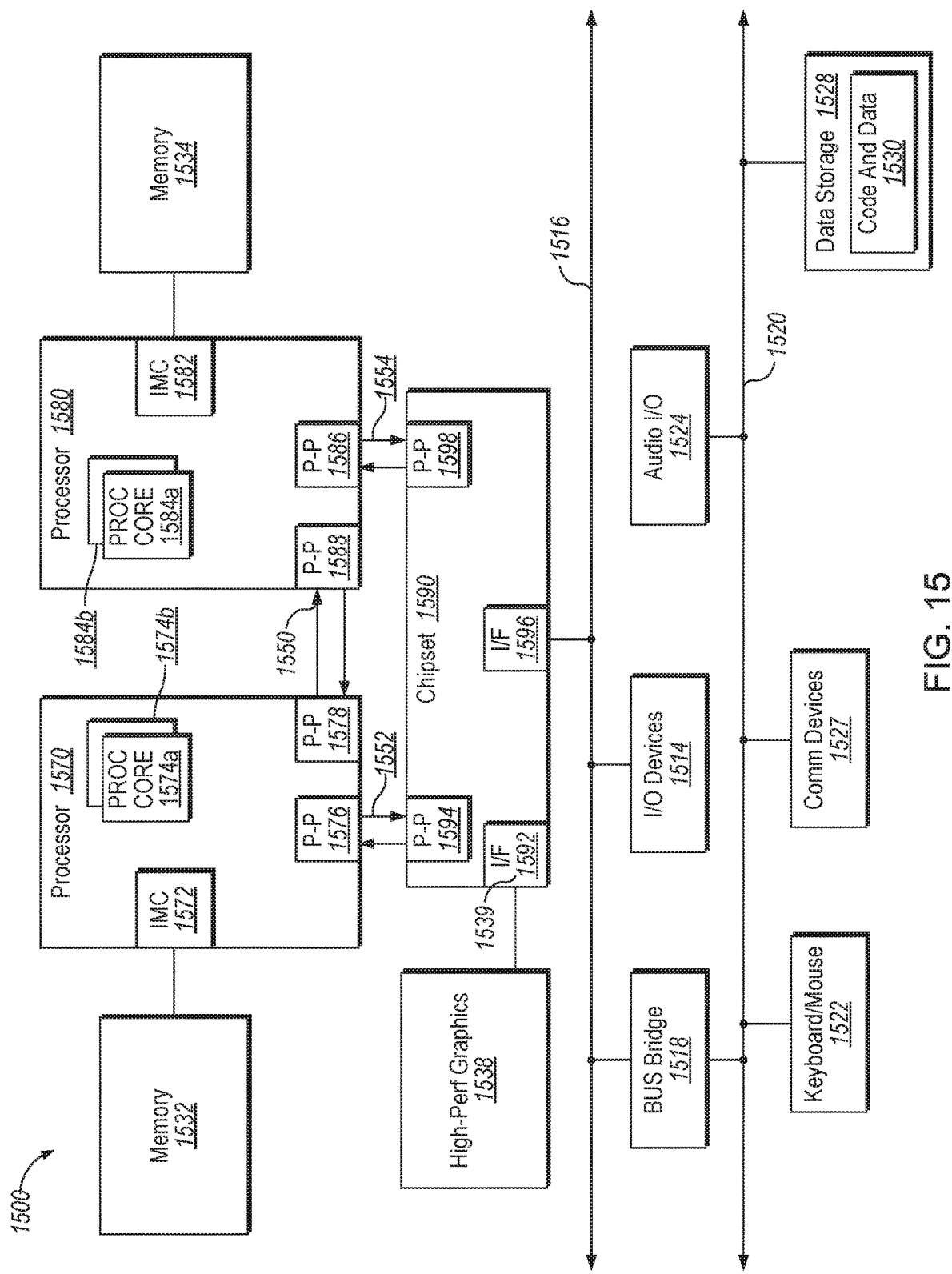
FIG. 15 is a block diagram of a computer system according to one implementation.

Embodiments may be implemented in many different system types. Referring now to FIG. 15, shown is a block diagram of a multiprocessor system 1500 in accordance with an implementation. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors.

While shown with two processors 1570, 1580, it is to be understood that the scope of the present disclosure is not so limited. In other implementations, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1588; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may also exchange information with a high-performance graphics circuit 1538 via a high-performance graphics interface 1539.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 1590 may be coupled to a first bus 1516 via an interface 1596. In one embodiment, first bus 1516 may be a Peripheral Component Interconnect (PCI) bus, or a bus such as a PCI Express bus or interconnect bus, although the scope of the present disclosure is not so limited.

Figure 16:
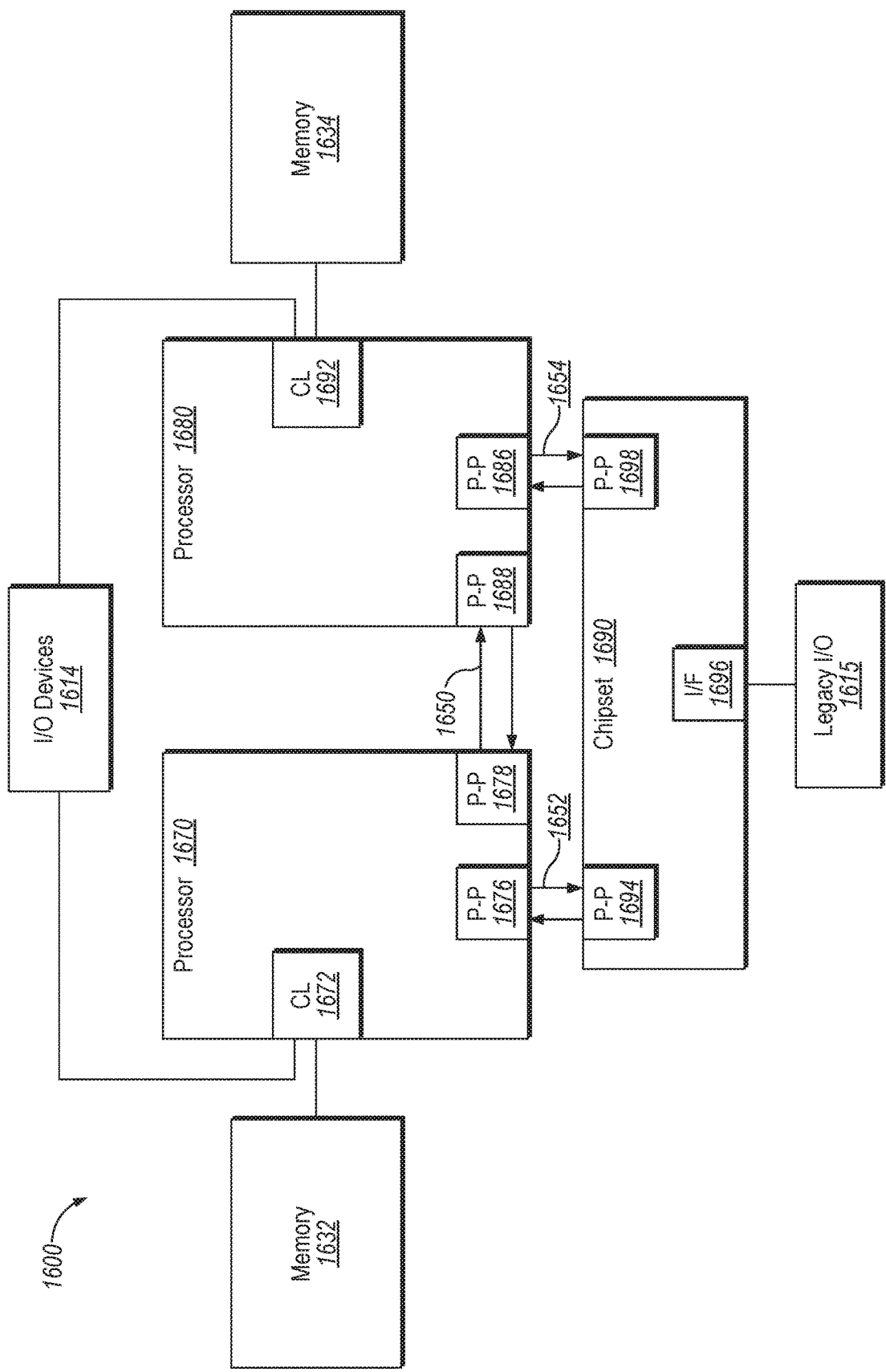
FIG. 16 is a block diagram of a computer system according to another implementation.

Referring now to FIG. 16, shown is a block diagram of a third system 1600 in accordance with an embodiment of the present disclosure. Like elements in FIGS. 15 and 16 bear like reference numerals, and certain aspects of FIG. 16 have been omitted from FIG. 15 in order to avoid obscuring other aspects of FIG. 16.

FIG. 16 illustrates that the processors 1670, 1680 may include integrated memory and I/O control logic ("CL") 1672 and 1692, respectively. For at least one embodiment, the CL 1672, 1682 may include integrated memory controller units such as described herein. In addition. CL 1672, 1692 may also include I/O control logic. FIG. 16 illustrates that the memories 1632, 1634 are coupled to the CL 1672, 1692, and that I/O devices 1614 are also coupled to the control logic 1672, 1692. Legacy I/O devices 1615 are coupled to the chipset 1690.

Figure 17:
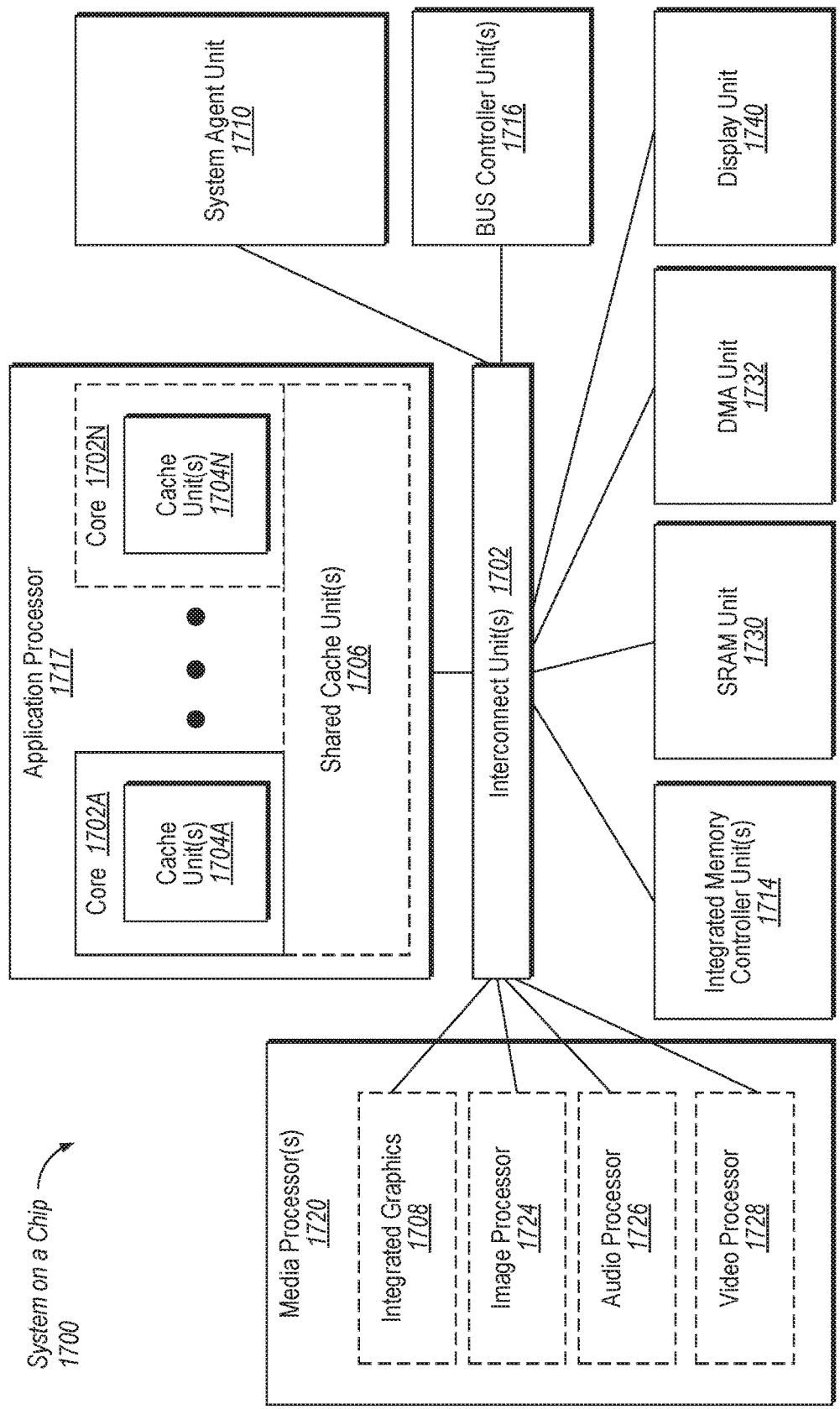
FIG. 17 is a block diagram of a system-on-a-chip according to one implementation.

FIG. 17 is an exemplary system on a chip (SoC) 1700 that may include one or more of the cores 1702A . . . 1702N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1700 of FIG. 17, dashed lined boxes are features on more advanced SoCs. An interconnect unit(s) 1702 may be coupled to: an application processor 1717 which includes a set of one or more cores 1702A-N and shared cache unit(s) 1706; a system agent unit 1710; a bus controller unit(s) 1716; an integrated memory controller unit(s) 1714; a set of one or more media processors 1720 which may include integrated graphics logic 1708, an image processor 1724 for providing still and/or video camera functionality, an audio processor 1726 for providing hardware audio acceleration, and a video processor 1728 for providing video encode/decode acceleration; a static random access memory (SRAM) unit 1730; a direct memory access (DMA) unit 1732; and a display unit 1740 for coupling to one or more external displays.

Figure 18:
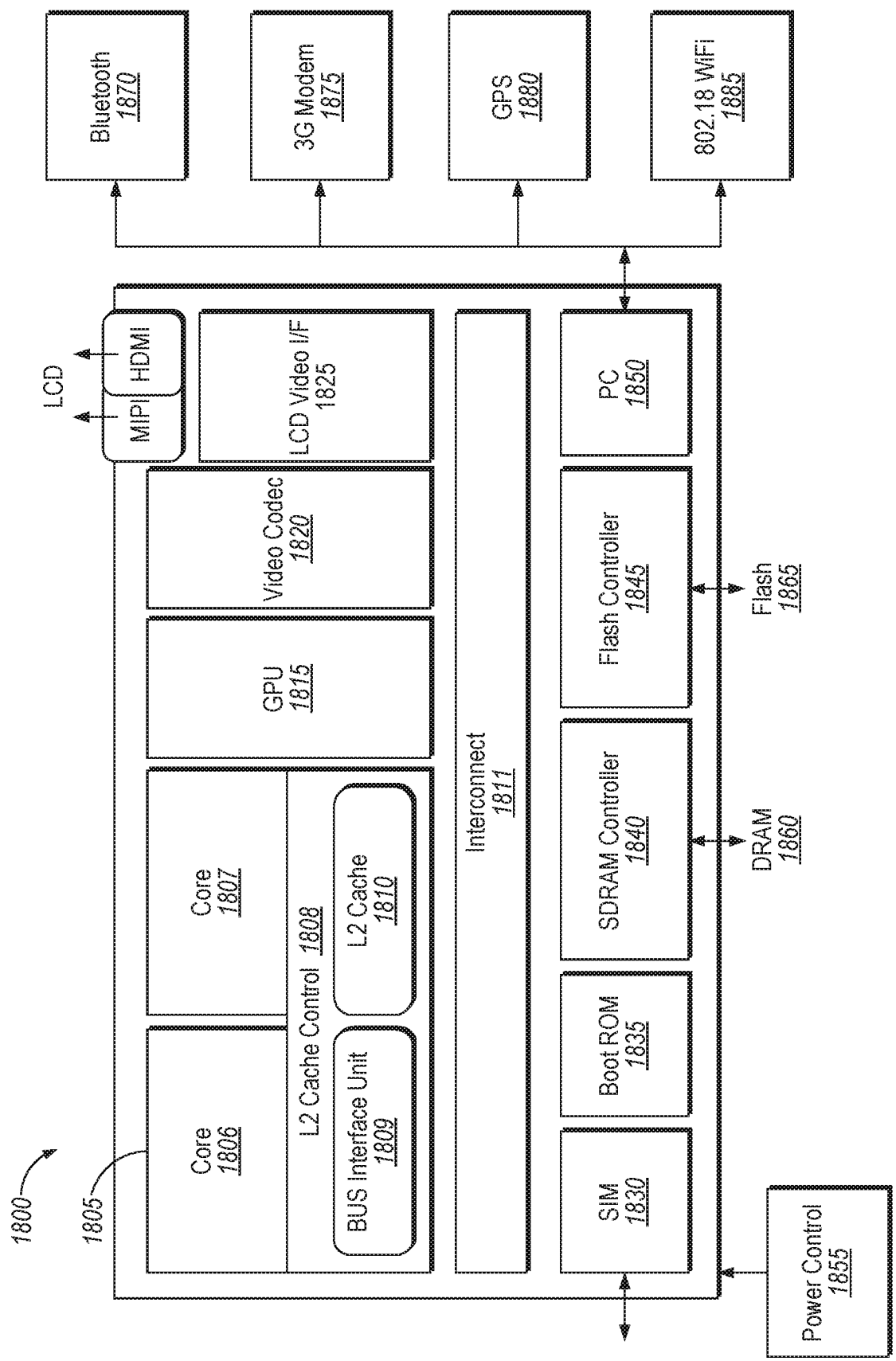
FIG. 18 illustrates another implementation of a block diagram for a computing system.

Turning next to FIG. 18, an embodiment of a system on-chip (SoC) design in accordance with embodiments of the disclosure is depicted. As an illustrative example, SoC 1800 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1800.

Here, SoC 1800 includes 2 cores—1806 and 1807. Similar to the discussion above, cores 1806 and 1807 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1806 and 1807 are coupled to cache control 1808 that is associated with bus interface unit 1809 and L2 cache 1810 to communicate with other parts of system 1800. Interconnect 1811 includes an on-chip interconnect, such as an IOSF, AMBA, or other interconnects discussed above, which can implement one or more aspects of the described disclosure.

In one embodiment, SDRAM controller 1840 may connect to interconnect 1811 via cache 1810. Interconnect 1811 provides communication channels to the other components, such as a Subscriber Identity Module (SIM) 1830 to interface with a SIM card, a boot ROM 1835 to hold boot code for execution by cores 1806 and 1807 to initialize and boot SoC 1800, a SDRAM controller 1840 to interface with external memory (e.g. DRAM 1860), a flash controller 1845 to interface with non-volatile memory (e.g. Flash 1865), a peripheral control 1850 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the embodiments described herein.

In addition, the system illustrates peripherals for communication, such as a Bluetooth® module 1870, 3G modem 1875, GPS 1880, and Wi-Fi® 1885. Note as stated above, a UE includes a radio for communication. As a result, these peripheral communication modules may not all be included. However, in a UE some form of a radio for external communication should be included.

Figure 19:
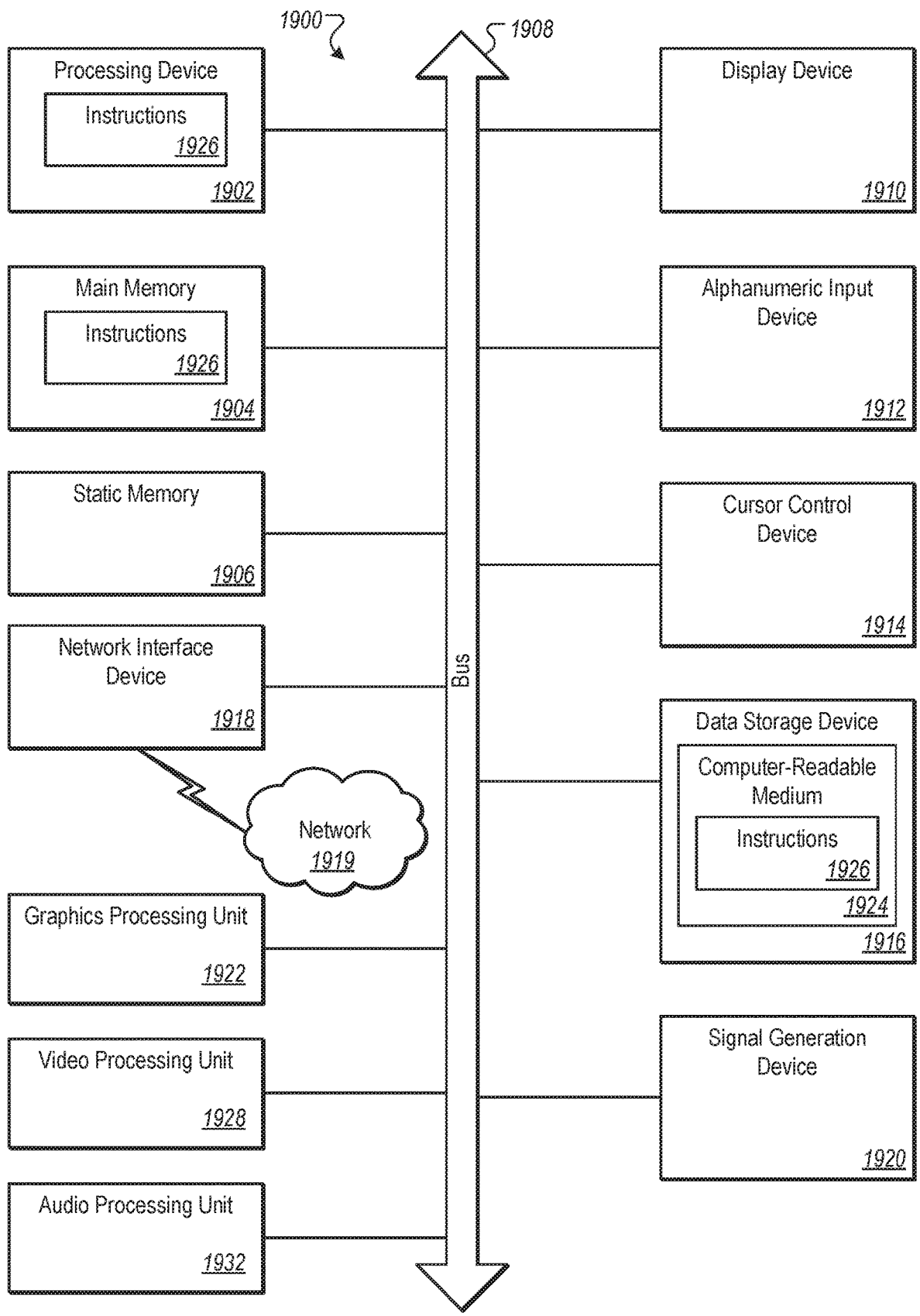
FIG. 19 illustrates another implementation of a block diagram for a computing system.

FIG. 19 illustrates a diagrammatic representation of a machine in the example form of a computing system 1900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1900.

The computing system 1900 includes a processing device 1902, main memory 1904 (e.g., flash memory, dynamic random access memory (DRAM) (such as synchronous DRAM (SDRAM) or DRAM (RDRAM), etc.), a static memory 1906 (e.g., flash memory, static random access memory (SRAM), etc.), and a data storage device 1918, which communicate with each other via a bus 1908.

Processing device 1902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1902 may also be one or more special-purpose processing devices such as an application-specific integrated circuit (ASIC), a field programmable gate array (FPGA), a digital signal processor (DSP), network processor, or the like. In one embodiment, processing device 1902 may include one or more processor cores. The processing device 1902 is configured to execute the processing logic 1926 for performing the operations discussed herein.

In one embodiment, processing device 1902 can be part of a processor or an integrated circuit that includes the memory subsystem and the acceleration hardware of FIGS. 1A-1B. Alternatively, the computing system 1900 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1900 may further include a network interface device 1918 communicably coupled to a network 1919. The computing system 1900 also may include a video display device 1910 (e.g., a liquid crystal display (LCD) or a cathode ray tube (CRT)), an alphanumeric input device 1910 (e.g., a keyboard), a cursor control device 1914 (e.g., a mouse), a signal generation device 1920 (e.g., a speaker), or other peripheral devices. Furthermore, computing system 1900 may include a graphics processing unit 1922, a video processing unit 1928 and an audio processing unit 1932. In another embodiment, the computing system 1900 may include a chipset (not illustrated), which refers to a group of integrated circuits, or chips, that are designed to work with the processing device 1902 and controls communications between the processing device 1902 and external devices. For example, the chipset may be a set of chips on a motherboard that links the processing device 1902 to very high-speed devices, such as main memory 1904 and graphic controllers, as well as linking the processing device 1902 to lower-speed peripheral buses of peripherals, such as USB, PCI or ISA buses.

The data storage device 1918 may include a computer-readable storage medium 1924 on which is stored software 1926 embodying any one or more of the methodologies of functions described herein. The software 1926 may also reside, completely or at least partially, within the main memory 1904 as instructions 1926 and/or within the processing device 1902 as processing logic during execution thereof by the computing system 1900; the main memory 1904 and the processing device 1902 also constituting computer-readable storage media.

The computer-readable storage medium 1924 may also be used to store instructions 1926 utilizing the processing device 1902, and/or a software library containing methods that call the above applications. While the computer-readable storage medium 1924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an integrated circuit comprising: 1) a memory interface coupled to a memory, the memory to store data corresponding to instructions being executed for a program; 2) an operations queue coupled to the memory interface, the operations queue to buffer memory operations corresponding to the instructions; 3) acceleration hardware to execute a sub-program corresponding to the instructions; 4) a set of input queues coupled to the acceleration hardware and to the memory interface, wherein the set of input queues are to receive, from the acceleration hardware: a) an address, of the memory, associated with a second memory operation of the memory operations; and b) a dependency token, associated with the address, that indicates a dependency on data generated by a first memory operation, of the memory operations, which precedes the second memory operation; and 5) a scheduler circuit coupled to the memory interface, the operations queue, and the set of input queues, wherein the scheduler circuit is to schedule issuance of the second memory operation to the memory in response to receipt, by the set of input queues, of the dependency token and the address.

In Example 2, the integrated circuit of Example 1, wherein the scheduler circuit is part of an operations manager circuit, and the operations manager circuit is to issue the second memory operation to the memory in response to completion of the first memory operation, wherein the first memory operation is one of a load operation, a store operation, or a fence operation, and the second memory operation is one of a load operation, a store operation, or a fence operation.

In Example 3, the integrated circuit of Example 1, wherein the second memory operation is a load operation, and the set of input queues comprises a load address queue, a store address queue, a store data queue, and a dependency queue, further comprising a completion queue coupled to the acceleration hardware and the memory interface, wherein the completion queue is to buffer the data received from the memory upon completion of the load operation.

In Example 4, the integrated circuit of Example 3, wherein one of the first memory operation and the second memory operation, as buffered in the operations queue, comprises memory arguments containing at least one of: 1) an input queue identifier to indicate an input channel within the set of input queues; 2) an output queue identifier to indicate an output channel within the completion queue; 3) a dependency queue identifier to indicate a dependency channel within the dependency queue; or 4) an operation type indicator to indicate type of memory operation.

In Example 5, the integrated circuit of Example 3, further comprising a set of counters, the set of counters including a first counter to generate the dependency token, and wherein the scheduler circuit is to schedule the load operation further in response to the first counter being unsaturated and having room in the completion queue to complete the second memory operation.

In Example 6, the integrated circuit of Example 3, wherein, in response to receipt of the data stored at the address in the memory, the completion queue is further to provide the data to the acceleration hardware with the dependency token.

In Example 7, the integrated circuit of Example 3, wherein the scheduler circuit is further to: a) determine that a third memory operation, which succeeds the load operation, depends on the data read by the load operation; b) duplicate the dependency token of the load operation; and c) issue the load operation to the memory with the dependency token, to indicate, to the third memory operation, a dependency on the data read by the load operation.

In Example 8, the integrated circuit of Example 1, wherein the second memory operation belongs to a plurality of executable memory operations buffered in the operations queue, further comprising: 1) a priority encoder to determine the second memory operation has a priority of execution from among the plurality of executable memory operations, and generate a selection signal to identify the second memory operation; and 2) a multiplexer to select the second memory operation from among the plurality of executable memory operations according to the selection signal.

Various embodiments may have different combinations of the structural features described above. For instance, all optional features of the computing system described above may also be implemented with respect to the method or process described herein and specifics in the examples may be used anywhere in one or more embodiments.

Example 9 is a memory ordering circuit comprising: 1) a memory interface coupled to a memory, the memory to store data corresponding to instructions being executed for a program; 2) an operations queue coupled to the memory interface, the operations queue to buffer memory operations corresponding to the instructions; 3) a set of input queues coupled to acceleration hardware, which is to execute a sub-program corresponding to the instructions, wherein the set of input queues is to receive, from the acceleration hardware: a) an address, of the memory, from which to retrieve data for a load operation of the memory operations; and b) a dependency token associated with the address, wherein the dependency token indicates a dependency on data stored by a store operation, of the memory operations, that precedes the load operation; and 4) a scheduler circuit coupled to the memory interface, the operations queue, and the set of input queues, wherein the scheduler circuit is to schedule issuance of the load operation to the memory in response to receipt, by the set of input queues, of the dependency token and the address.

In Example 10, the memory ordering circuit of Example 9, wherein the set of input queues comprises: 1) a load address queue to receive, from the acceleration hardware, the address of the memory; 2) a store address queue to receive, from the acceleration hardware, the address of the memory, the address associated with the store operation; 3) a store data queue to receive, from the acceleration hardware, the data associated with the address for the store operation; and 4) a dependency queue to receive, from the acceleration hardware, the dependency token associated with the address in the load address queue In Example 11, the memory ordering circuit of Example 9, further comprising a completion queue coupled to the acceleration hardware and the memory interface, wherein the completion queue is to buffer the data received from the address of the memory upon completion of the load operation, and wherein one of the load operation or the store operation, as queued in the operations queue, comprises memory arguments containing at least one of: 1) an input queue identifier to indicate an input channel within the set of input queues; 2) an output queue identifier to indicate an output channel within the completion queue; 3) a dependency queue identifier to indicate a dependency channel within a dependency queue of the set of input queues; or 4) an operation type indicator to indicate type of memory operation.

In Example 12, the memory ordering circuit of Example 11, wherein the scheduler circuit is further to indicate the load operation is executable in view of the dependency token, availability of the address in the set of input queues, and availability of a slot in the completion queue at which to buffer the data.

In Example 13, the memory ordering circuit of Example 12, wherein the memory ordering circuit further comprises an execution circuit coupled to the scheduler circuit, the execution circuit comprising a priority encoder to generate a selector signal to identify the load operation in response to determining the load operation has the priority of execution from among a plurality of executable memory operations in the operations queue, and wherein the execution circuit further comprises a selection circuitry to: a) select, in response to the selection signal, the load operation from the plurality of executable memory operations in the operations queue; and b) transmit a control signal, indicative of selection of the load operation, to a set of multiplexers to pass the address and data to a memory command to be transmitted to the memory.

In Example 14, the memory ordering circuit of Example 12, wherein the scheduler circuit determines that the store operation is executable in response to a store data queue, of the set of input queues, containing the data associated with the address buffered in a store address queue of the set of input queues.

In Example 15, the memory ordering circuit of Example 9, further comprising a plurality of counters coupled to a dependency queue, of the set of input queues, and to the scheduler circuit, the plurality of counters including a first counter to generate a second dependency token for a subsequent memory operation that depends on a result of the load operation.

In Example 16, the memory ordering circuit of Example 15, wherein the scheduler circuit is further to: a) determine that the subsequent memory operation depends on the data retrieved from the address in the memory by the load operation; b) provide a dependency argument within the subsequent memory operation, the dependency argument to identify the dependency queue in association with a second address to be buffered in a store address queue of the set of input queues; c) trigger generation of a second dependency token in response to arrival of the data from the address in the memory, in completion of the load operation; and d) schedule the subsequent memory operation for issuance in response to the dependency queue receiving the second dependency token and the store address queue receiving the second address.

In Example 17, the memory ordering circuit of Example 9, further comprising a completion queue coupled to the acceleration hardware and to the scheduler circuit, the completion queue to buffer data received in response to completion of the load operation, and wherein the scheduler circuit is further to: a) allocate an index into the completion queue comprising an in-order next slot for the load operation, to generate an index allocation; b) communicate the index allocation to the memory to indicate where to send the data in response to completion of the load operation; c) enqueue the data within the completion queue upon arrival of the data; and d) set to valid a validity bit associated with the in-order next slot.

In Example 18, the memory ordering circuit of Example 17, wherein the scheduler circuit is further to dequeue the data and set the validity bit to invalid in response to providing the data to the acceleration hardware in completing the load operation.

Various embodiments may have different combinations of the structural features described above. For instance, all optional features of the processors and methods described above may also be implemented with respect to a system described herein and specifics in the examples may be used anywhere in one or more embodiments.

Example 19 is a method comprising: 1) queuing memory operations in an operations queue of a memory ordering circuit, the memory operations to interact with a memory in association with acceleration hardware, wherein a processor requests the memory operations to the memory out of program order; 2) receiving, in a set of input queues from the acceleration hardware, an address of the memory associated with a second memory operation of the memory operations; 3) receiving, from the acceleration hardware, a dependency token associated with the address, wherein the dependency token indicates a dependency on data generated by a first memory operation, of the memory operations, which precedes the second memory operation; and 4) scheduling, by the memory ordering circuit, issuance of the second memory operation to the memory in response to receiving the dependency token and the address associated with the dependency token.

In Example 20, the method of Example 19, further comprising issuing the second memory operation to the memory in response to completion of the first memory operation, wherein the first memory operation is one of a load operation, a store operation, or a fence operation, and the second memory operation is one of a load operation, a store operation, or a fence operation.

In Example 21, the method of Example 19, wherein the first memory operation comprises a store operation and wherein the second memory operation comprises a load operation to read the data at the address in the memory, the method further comprising: 1) scheduling, by a scheduler circuit of the memory ordering circuit, the second memory operation in response to detecting the dependency token and receipt of the address in a load address queue; 2) determining that a subsequent memory operation depends on the data retrieved from the address in the memory upon completion of the load operation; 3) providing a dependency argument within the subsequent memory operation, the dependency argument identifying a dependency queue in association with a second address to be buffered in the set of input queues; d) triggering generation of a second dependency token for the dependency queue in response to, with respect to the load operation, one of sending the address to the memory or arrival of the data from the address in the memory; and e) scheduling, by the scheduler circuit, the subsequent memory operation for issuance in response to the dependency queue receiving the second dependency token and the set of input queues receiving the second address.

In Example 22, the method of Example 19, wherein the memory ordering circuit further comprises a set of counters, the set of counters including a first counter to generate the dependency token, and wherein scheduling the second memory operation for issuance is further in response to the first counter being unsaturated and having room in a completion queue to complete the second memory operation.

In Example 23, the method of Example 19, wherein, in response to receiving data stored at the address in the memory upon completion of the second memory operation, the method further comprising providing, by a completion queue, the data to the acceleration hardware with the dependency token.

In Example 24, the method of Example 19, wherein the second memory operation of the memory operations belongs to a group of executable memory operations queued in the operations queue, the method further comprising: 1) determining, by a priority encoder of the memory ordering circuit, the second memory operation has a priority of execution from among the group of executable memory operations; 2) generating, by the priority encoder, a selection signal identifying the second memory operation; and 3) selecting the second memory operation from among the group of executable memory operations according to the selection signal.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
    a memory interface coupled to a memory;
    acceleration hardware, coupled to the memory interface, to execute a dataflow graph;
    memory operations configuration storage coupled to the memory interface, the memory operations configuration storage to store configurations for memory operations corresponding to the dataflow graph;
    a set of input queues coupled to the acceleration hardware and to the memory interface, wherein the set of input queues is to receive, from the acceleration hardware:
        an address, of the memory, associated with a second memory operation of the memory operations, and
        a dependency token, associated with the address, that indicates a dependency on data generated by a first memory operation, of the memory operations, which precedes the second memory operation; and
    a scheduler circuit to schedule issuance of the second memory operation to the memory in response to receipt from the acceleration hardware of both the address in an address queue of the set of input queues and the dependency token in a dependency queue, of the set of input queues, corresponding to the address queue as indicated by a configuration for the second memory operation in the memory operations configuration storage.

2. The apparatus of claim 1, wherein the scheduler circuit is part of an operations manager circuit, and the operations manager circuit is to issue the second memory operation to the memory in response to completion of the first memory operation, wherein the first memory operation is one of a load operation, a store operation, or a fence operation, and the second memory operation is one of a load operation, a store operation, or a fence operation.

3. The apparatus of claim 1, wherein the second memory operation is a load operation, and the set of input queues comprises a load address queue, a store address queue, a store data queue, a load dependency queue, and a store dependency queue, further comprising a completion queue coupled to the acceleration hardware and the memory interface, wherein the completion queue is to buffer the data received from the memory upon completion of the load operation.

4. The apparatus of claim 3, wherein a configuration of the first memory operation and a configuration of the second memory operation, as stored in the memory operations configuration storage each comprises memory arguments of:
    an input queue identifier to indicate an input channel within the set of input queues;

an output queue identifier to indicate an output channel within the completion queue;

a dependency queue identifier to indicate a dependency channel within the load dependency queue or the store dependency queue; and an operation type indicator to indicate type of memory operation.

5. The apparatus of claim 3, further comprising a set of counters, the set of counters including a first counter to generate the dependency token, and wherein the scheduler circuit is to schedule the load operation further in response to the first counter being unsaturated and having room in the completion queue to complete the second memory operation.

6. The apparatus of claim 3, wherein, in response to receipt of the data stored at the address in the memory, the completion queue is further to provide the data to the acceleration hardware with the dependency token.

7. The apparatus of claim 3, wherein the scheduler circuit is further to:

determine that a third memory operation, which succeeds the load operation, depends on the data read by the load operation;

duplicate the dependency token of the load operation; and issue the load operation to the memory with the dependency token, to indicate, to the third memory operation, a dependency on the data read by the load operation.

8. The apparatus of claim 1, wherein the second memory operation belongs to a plurality of executable memory operations with configurations stored in the memory operations configuration storage, further comprising:

a priority encoder to determine the second memory operation has a priority of execution from among the plurality of executable memory operations, and generate a selection signal to identify the second memory operation; and a multiplexer to select the second memory operation from among the plurality of executable memory operations according to the selection signal.

9. A memory ordering circuit comprising:

a memory interface coupled to a memory;

memory operations configuration storage coupled to the memory interface, the memory operations configuration storage to store configurations for memory operations;

a set of input queues to couple to acceleration hardware, which is to execute a dataflow graph, wherein the set of input queues is to receive, from the acceleration hardware:

an address, of the memory, from which to retrieve data for a load operation of the memory operations, and a dependency token associated with the address, wherein the dependency token indicates a dependency on data stored by a store operation, of the memory operations, that precedes the load operation; and a scheduler circuit coupled to the memory interface, the memory operations configuration storage, and the set of input queues, wherein the scheduler circuit is to schedule issuance of the load operation to the memory in response to receipt, by the set of input queues from the acceleration hardware, of both the address in an address queue of the set of input queues and the dependency token in a dependency queue, of the set of input queues, corresponding to the address queue as indicated by a configuration for the load operation in the memory operations configuration storage.

10. The memory ordering circuit of claim 9, wherein the set of input queues comprises:

a load address queue to receive, from the acceleration hardware, the address of the memory associated with the load operation;

a store address queue to receive, from the acceleration hardware, the address of the memory associated with the store operation;

a store data queue to receive, from the acceleration hardware, the data associated with the address for the store operation;

a store dependency queue to receive, from the acceleration hardware, the dependency token associated with the address in the store address queue; and a load dependency queue to receive, from the acceleration hardware, the dependency token associated with the address in the load address queue.

11. The memory ordering circuit of claim 9, further comprising a completion queue coupled to the acceleration hardware and the memory interface, wherein the completion queue is to buffer the data received from the address of the memory upon completion of the load operation, and wherein a configuration of the load operation or a configuration of the store operation, as stored in the memory operations configuration storage, comprises memory arguments of:

an input queue identifier to indicate an input channel within the set of input queues;

an output queue identifier to indicate an output channel within the completion queue;

a dependency queue identifier to indicate a dependency channel within a load dependency queue or a store dependency queue of the set of input queues; and an operation type indicator to indicate type of memory operation.

12. The memory ordering circuit of claim 11, wherein the scheduler circuit is further to indicate the load operation is executable in view of the dependency token, availability of the address in the set of input queues, and availability of a slot in the completion queue at which to buffer the data.

13. The memory ordering circuit of claim 12, wherein the memory ordering circuit further comprises an execution circuit coupled to the scheduler circuit, the execution circuit comprising a priority encoder to generate a selector signal to identify the load operation in response to determining the load operation has a priority of execution from among a plurality of executable memory operations with configurations stored in the memory operations configuration storage, and wherein the execution circuit further comprises selection circuitry to:

select, in response to the selection signal, the load operation from the plurality of executable memory operations; and transmit a control signal, indicative of selection of the load operation, to a set of multiplexers to pass the address and data as a memory command to be transmitted to the memory.

14. The memory ordering circuit of claim 12, wherein the scheduler circuit determines that the store operation is executable in response to a store data queue, of the set of input queues, containing the data associated with the address buffered in a store address queue of the set of input queues.

15. The memory ordering circuit of claim 9, further comprising a plurality of counters coupled to the dependency queue, of the set of input queues, and to the scheduler circuit, the plurality of counters including a first counter to generate a second dependency token for a subsequent memory operation that depends on a result of the load operation.

16. The memory ordering circuit of claim 15, wherein the scheduler circuit is further to:
   determine that the subsequent memory operation depends on the data retrieved from the address in the memory by the load operation;
   provide a dependency argument within the subsequent memory operation, the dependency argument to identify the dependency queue in association with a second address to be buffered in a store address queue of the set of input queues;
   trigger generation of the second dependency token in response to arrival of the data from the address in the memory, in completion of the load operation; and
   schedule the subsequent memory operation for issuance in response to the dependency queue receiving the second dependency token and the store address queue receiving the second address.

17. The memory ordering circuit of claim 9, further comprising a completion queue coupled to the acceleration hardware and to the scheduler circuit, the completion queue to buffer data received in response to completion of the load operation, and wherein the scheduler circuit is further to:
   allocate an index into the completion queue comprising an in-order next slot for the load operation, to generate an index allocation;
   communicate the index allocation to the memory to indicate where to send the data in response to completion of the load operation;
   enqueue the data within the completion queue upon arrival of the data; and
   set to valid a validity bit associated with the in-order next slot.

18. The memory ordering circuit of claim 17, wherein the scheduler circuit is further to dequeue the data and set the validity bit to invalid in response to providing the data to the acceleration hardware in completing the load operation.

19. A method comprising:
   storing configurations for memory operations in a memory operations configuration storage of a memory ordering circuit, the memory operations to interact with a memory in association with acceleration hardware that requests the memory operations to the memory out of program order;
   receiving, in an address queue of a set of input queues and from the acceleration hardware, an address of the memory associated with a second memory operation of the memory operations;
   receiving, from the acceleration hardware and in a dependency queue of the set of input queues indicated by a configuration for the second memory operation in the memory operations configuration storage, a dependency token associated with the address, wherein the dependency token indicates a dependency on data generated by a first memory operation, of the memory operations, which precedes the second memory operation; and
   scheduling, by the memory ordering circuit, issuance of the second memory operation to the memory in response to receiving, from the acceleration hardware, both the dependency token and the address associated with the dependency token.

20. The method of claim 19, further comprising issuing the second memory operation to the memory in response to completion of the first memory operation, wherein the first memory operation is one of a load operation, a store operation, or a fence operation, and the second memory operation is one of a load operation, a store operation, or a fence operation.

21. The method of claim 19, wherein the first memory operation comprises a store operation and wherein the second memory operation comprises a load operation to read the data at the address in the memory, the method further comprising:
   determining that a subsequent memory operation depends on the data retrieved from the address in the memory upon completion of the load operation;
   providing a dependency argument within the subsequent memory operation, the dependency argument identifying a dependency queue in association with a second address to be buffered in the set of input queues;
   triggering generation of a second dependency token for the dependency queue in response to, with respect to the load operation, one of sending the address to the memory or arrival of the data from the address in the memory; and
   scheduling, by the memory ordering circuit, the subsequent memory operation for issuance in response to the dependency queue, in association with the second address to be buffered in the set of input queues, receiving the second dependency token and the set of input queues receiving the second address.

22. The method of claim 19, wherein the memory ordering circuit further comprises a set of counters, the set of counters including a first counter to generate the dependency token, and wherein scheduling the second memory operation for issuance is further in response to the first counter being unsaturated and having room in a completion queue to complete the second memory operation.

23. The method of claim 19, wherein, in response to receiving data stored at the address in the memory upon completion of the second memory operation, the method further comprising providing, by a completion queue, the data to the acceleration hardware with the dependency token.

24. The method of claim 19, wherein the second memory operation of the memory operations belongs to a group of executable memory operations having configurations stored in the memory operations configuration storage, the method further comprising:
   determining, by a priority encoder of the memory ordering circuit, the second memory operation has a priority of execution from among the group of executable memory operations;
   generating, by the priority encoder, a selection signal identifying the second memory operation; and
   selecting the second memory operation from among the group of executable memory operations according to the selection signal.

* * * * *